United States Patent
Lee

(10) Patent No.: US 12,118,749 B2
(45) Date of Patent: Oct. 15, 2024

(54) CALIBRATION SYSTEM AND CALIBRATION METHOD FOR MULTI-CAMERA SYSTEM

(71) Applicant: eYs3D Microelectronics, Co., Taipei (TW)

(72) Inventor: Chi-Feng Lee, Taipei (TW)

(73) Assignee: eYs3D Microelectronics, Co., Taipei (TW)

( * ) Notice: Subject to any disclaimer, the term of this patent is extended or adjusted under 35 U.S.C. 154(b) by 41 days.

(21) Appl. No.: 18/319,503

(22) Filed: May 18, 2023

(65) Prior Publication Data

US 2023/0377198 A1   Nov. 23, 2023

Related U.S. Application Data

(60) Provisional application No. 63/343,547, filed on May 19, 2022.

(30) Foreign Application Priority Data

May 4, 2023   (TW) ................................. 112116628

(51) Int. Cl.
  *G06T 7/80*   (2017.01)
  *G06T 7/60*   (2017.01)
  *H04N 17/00*   (2006.01)

(52) U.S. Cl.
  CPC ................. G06T 7/80 (2017.01); G06T 7/60 (2013.01); H04N 17/002 (2013.01); *G06T 2207/10024* (2013.01); *G06T 2207/30204* (2013.01)

(58) Field of Classification Search
  CPC ... G06T 7/60; G06T 7/80; G06T 2207/10024; G06T 2207/30204; G06T 2207/30208; H04N 17/002
  See application file for complete search history.

(56) References Cited

U.S. PATENT DOCUMENTS 5,612,744 A * 3/1997 Lee ...................... H04N 19/105
                                                375/E7.133
6,041,078 A * 3/2000 Rao ........................ H04N 19/51
                                                375/E7.256

(Continued)

*Primary Examiner* — Michael B. Pierorazio
(74) *Attorney, Agent, or Firm* — JCIPRNET

(57) ABSTRACT

A calibration system for a multi-camera system is disclosed. The calibration system includes a connection device, a storage device, and a processor. The processor is configured to control each camera of the multi-camera system to capture a calibration image of a calibration board having a pattern including multiple conventional features and at least one non-conventional feature in which an FOV of the calibration image of at least one camera does not contain at least one conventional feature of the pattern, detect the conventional features and the non-conventional feature in the calibration image and record positions thereof in the storage device, transform a position of each conventional feature into absolute coordinates relative to reference coordinates by using a position of the non-conventional feature as the reference coordinates, and according to the absolute coordinates of the transformed conventional features, match the conventional features in the calibration images captured by the cameras to calibrate the cameras.

20 Claims, 20 Drawing Sheets

(56) References Cited

U.S. PATENT DOCUMENTS

| | | | |
|---|---|---|---|
| 6,654,420 B1* | 11/2003 | Snook | H04N 19/56 375/E7.15 |
| 6,674,904 B1* | 1/2004 | McQueen | G06T 7/13 382/199 |
| 7,546,334 B2* | 6/2009 | Redlich | G06F 21/6263 709/219 |
| 8,135,232 B2* | 3/2012 | Kimura | H04N 19/86 382/268 |
| 8,402,551 B2* | 3/2013 | Lee | G06F 21/1075 726/4 |
| 8,447,117 B2* | 5/2013 | Liao | H04N 19/865 382/199 |
| 9,736,468 B2* | 8/2017 | Lee | H04N 17/002 |
| 11,367,204 B1* | 6/2022 | Liao | G06T 7/13 |
| 11,688,102 B2* | 6/2023 | Lin | G06T 7/521 348/50 |
| 2002/0112181 A1* | 8/2002 | Smith | H04L 63/105 726/14 |
| 2003/0036886 A1* | 2/2003 | Stone | G06F 11/3495 714/E11.202 |
| 2004/0091151 A1* | 5/2004 | Jin | G06V 10/46 382/199 |
| 2005/0138110 A1* | 6/2005 | Redlich | G06F 21/6254 709/201 |
| 2005/0193311 A1* | 9/2005 | Das | H04N 19/537 714/753 |
| 2008/0005666 A1* | 1/2008 | Sefton | G06F 40/186 715/234 |
| 2008/0163378 A1* | 7/2008 | Lee | G06F 21/1075 380/279 |
| 2009/0178019 A1* | 7/2009 | Bahrs | G06F 21/62 717/104 |
| 2009/0178144 A1* | 7/2009 | Redlich | G06F 21/6209 726/27 |
| 2009/0254572 A1* | 10/2009 | Redlich | G06Q 10/10 |
| 2010/0005179 A1* | 1/2010 | Dickson | H04L 63/30 709/228 |
| 2010/0158402 A1* | 6/2010 | Nagase | G09G 3/20 345/87 |
| 2010/0250497 A1* | 9/2010 | Redlich | G06Q 10/06 707/661 |
| 2011/0110603 A1* | 5/2011 | Ikai | H04N 19/176 382/260 |
| 2011/0129156 A1* | 6/2011 | Liao | H04N 19/865 382/199 |
| 2011/0164824 A1* | 7/2011 | Kimura | H04N 17/004 382/199 |
| 2012/0030733 A1* | 2/2012 | Andrews | H04L 63/105 726/4 |
| 2012/0173971 A1* | 7/2012 | Sefton | G06F 40/186 715/256 |
| 2012/0252407 A1* | 10/2012 | Poltorak | H04M 15/80 455/410 |
| 2012/0287247 A1* | 11/2012 | Stenger | H04N 13/128 348/47 |
| 2012/0321083 A1* | 12/2012 | Phadke | H04N 21/2541 380/255 |
| 2013/0051476 A1* | 2/2013 | Morris | H04N 19/137 375/E7.026 |
| 2013/0063241 A1* | 3/2013 | Simon | G08B 25/14 340/3.1 |
| 2013/0091290 A1* | 4/2013 | Hirokawa | H04L 67/141 709/227 |
| 2018/0262748 A1* | 9/2018 | Shibata | G02B 27/32 |
| 2020/0074684 A1* | 3/2020 | Lin | H04N 13/204 |

* cited by examiner

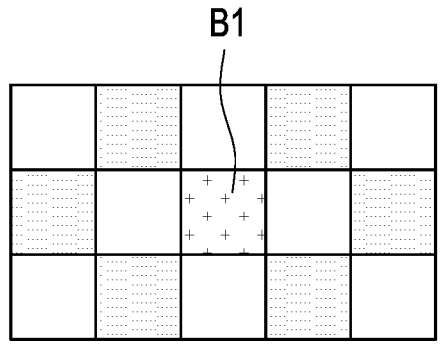
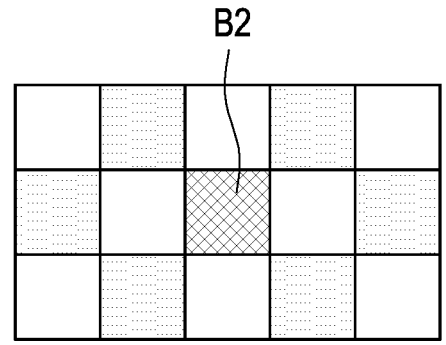
FIG. 4A              FIG. 4B
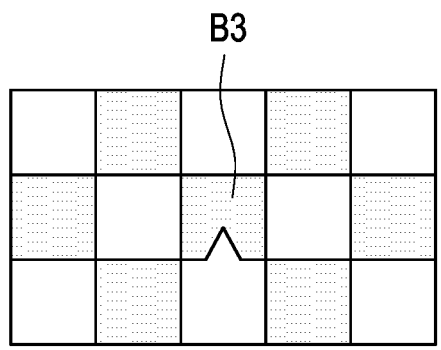
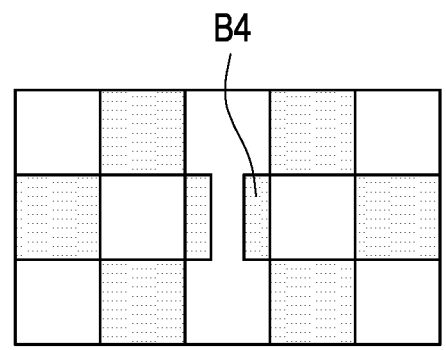
FIG. 4C              FIG. 4D
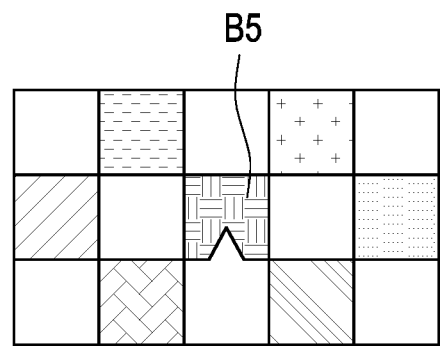
FIG. 4E

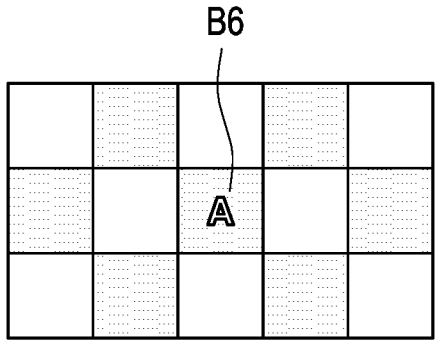
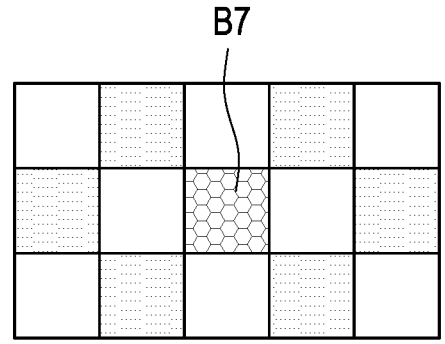
FIG. 4F
FIG. 4G
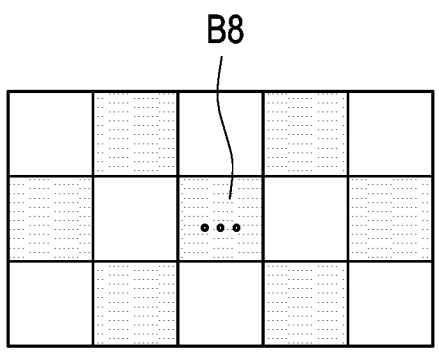
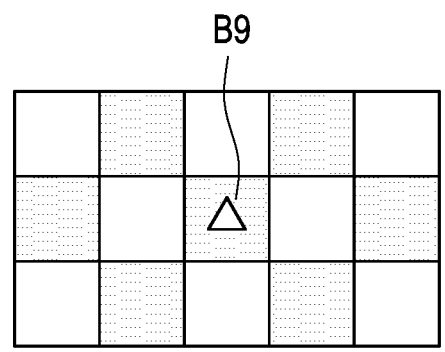
FIG. 4H
FIG. 4I
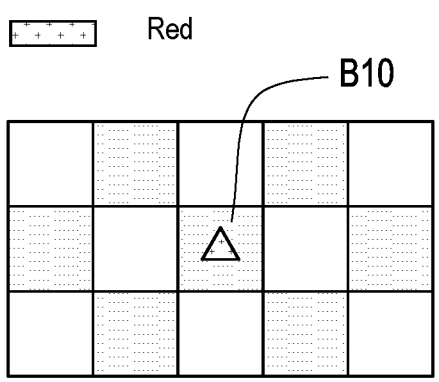
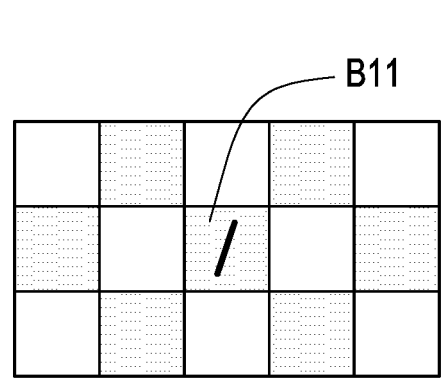
FIG. 4J
FIG. 4K

CALIBRATION SYSTEM AND CALIBRATION METHOD FOR MULTI-CAMERA SYSTEM

CROSS-REFERENCE TO RELATED APPLICATION

This application claims the priority benefits of U.S. provisional application Ser. No. 63/343,547, filed on May 19, 2022 and Taiwan application serial no. 112116628, filed on May 4, 2023. The entirety of each of the above-mentioned patent applications is hereby incorporated by reference herein and made a part of this specification.

BACKGROUND

Technical Field

The invention relates to a calibration system and a calibration method, and more particularly, to a calibration system and a calibration method for a multi-camera system.

Description of Related Art

Generally, in a multi-camera system, errors (such as geometric errors and color errors) may occur between cameras due to assembly tolerances or process differences. Geometric errors are usually caused by assembly tolerances or lens characteristics, while color errors are usually caused by process differences of sensors and lenses, where the geometric errors include lens distortion, camera offset, skew or rotation, and the color errors include color and brightness differences between the cameras.

If the multi-camera system is not calibrated, images generated by the multi-camera system may have some problems due to the geometric errors and the color errors. For example, when generating a three-dimensional (3D) image, the image generated by the multi-camera system may not be able to reconstruct an original 3D effect in user's eyes due to the offset between the cameras; when generating a depth map, the multi-camera system may generate incorrect depth information; and when applied to image stitching, the images generated by the multi-camera system may have problems of discontinuous stitched images and discontinuous colors.

FIG. 1A and FIG. 1B are respectively schematic diagrams of an existing calibration method for a multi-camera system and a calibration board used therein. Referring to FIG. 1A and FIG. 1B, the existing calibration method for the multi-camera system is to use multiple cameras CA1 and CA2 to respectively capture images of a specific pattern P on the calibration board, so as to analyze features F1-F9 in the captured images. Based on an overlap of fields of view FOV1 and FOV2 of the cameras CA1 and CA2, the calibration system may match the features F1-F9 in the images captured by the cameras CA1 and CA2 to obtain a deviation (offset, skew or rotation) of the cameras CA1, CA2 through a calibration procedure, so as to calibrate the cameras CA1 and CA2.

However, the existing calibration method needs to obtain all of the features F1-F9 of the pattern P to perform feature matching. If a baseline between the cameras CA1 and CA2 becomes larger and a size of the pattern P remains unchanged, the overlap part between the fields of view FOV1 and FOV2 of the camera CA1 and CA2 becomes smaller, and the cameras CA1 and CA2 only obtain a part of the features F1-F9 respectively. As a result, a failure rate of calibration increases or calibration cannot be performed due to the lack of common features.

SUMMARY

The invention relates to a calibration system and a calibration method for a multi-camera system, in which by adding non-conventional features different from conventional features to a pattern of a calibration board, a success rate of calibration is increased.

The invention provides a calibration system for a multi-camera system, which includes a connection device, a storage device, and a processor. The connection device is coupled to multiple cameras. The processor is coupled to the connection device and the storage device, and is configured to control each of the cameras to capture a calibration image of a calibration board, in which the calibration board has a pattern including multiple conventional features and at least one non-conventional feature, and a field of view (FOV) of the calibration image of at least one of the cameras does not contain at least one of the conventional features of the pattern, detects the conventional features and the non-conventional feature in the calibration image and records positions of the conventional features and the non-conventional feature in the storage device, uses the position of the non-conventional feature as reference coordinates to transform the position of each of the conventional features into absolute coordinates relative to the reference coordinates, and matches the conventional features in the calibration images captured by the cameras according to the absolute coordinates of the transformed conventional features, so as to calibrate the cameras.

In some embodiment, the pattern is a checkerboard formed by multiple blocks of different colors arranged in interleaving, and the conventional features are intersections of the blocks.

In some embodiment, the processor is configured to detect a form of each of the blocks in the checkerboard to identify at least one of the blocks with the form changed as the non-conventional feature, and the form includes at least one of color, shape, texture, presence/absence, and density.

In some embodiment, the processor is configured to detect a form of each of the blocks in the checkerboard to identify the conventional feature added or deleted due to a change of the form of at least one of the blocks as the non-conventional feature, and the form includes at least one of shape, texture, presence/absence, and density.

In some embodiments, the processor is configured to identify a geometric figure configured at the position of at least one of the conventional features as the non-conventional feature.

In some embodiments, the pattern includes multiple geometric figures arranged according to a predetermined rule, and the conventional features are the geometric figures.

In some embodiments, the processor is configured to detect a form of each of the geometric figures in the pattern to identify at least one of the geometric figures with the form changed as the non-conventional feature, and the form includes at least one of color, shape, texture, presence/absence, and density.

In some embodiments, the processor is configured to detect a form of each of the geometric figures in the pattern to identify the conventional feature added or deleted due to a change of the form of at least one of the geometric figures as the non-conventional feature.

In some embodiments, the processor is configured to detect a form of a background around at least one of the geometric figures in the pattern to identify the background with the form changed as the non-conventional feature, and the form includes at least one of color, shape, size, and texture.

In some embodiments, the processor is configured to identify a checkerboard formed by multiple blocks of different colors arranged in interleaving at the position of the at least one of the conventional features as the non-conventional feature.

In some embodiments, the processor is configured to predict a position of a next conventional feature based on the positions of the sequentially arranged conventional features.

In some embodiments, the calibration board is a three-dimensional object, and at least one surface of the three-dimensional object includes the pattern.

In some embodiments, the position of the non-conventional feature includes a position of a center point or an endpoint of the non-conventional feature.

In some embodiments, the processor is configured to use the conventional features matched with each other in the calibration images captured by the cameras to calculate extrinsic parameters or intrinsic parameters of the cameras.

In some embodiments, a density of the geometric figures in the pattern is determined by a lens characteristic of each of the cameras.

The invention provides a calibration method for a multi-camera system, which includes the following. Each of multiple cameras are controlled to capture a calibration image of a calibration board. The calibration board has a pattern including multiple conventional features and at least one non-conventional feature, and a field of view (FOV) of the calibration image of at least one of the cameras does not contain at least one of the conventional features of the pattern. The conventional features and the non-conventional feature in the calibration images are detected, and positions of the conventional features and the non-conventional feature are recorded in a storage device. The position of the non-conventional feature is used as reference coordinates to transform the position of each of the conventional features into absolute coordinates relative to the reference coordinates. The conventional features in the calibration images captured by the cameras are matched according to the absolute coordinates of the transformed conventional features, so as to calibrate the cameras.

In some embodiment, the pattern is a checkerboard formed by multiple blocks of different colors arranged in interleaving, and the conventional features are intersections of the blocks.

In some embodiment, the pattern includes multiple geometric figures arranged according to a predetermined rule, and the conventional features are the geometric figures.

In some embodiment, a position of a next conventional feature is predicted based on the positions of the sequentially arranged conventional features.

In some embodiment, a density of the geometric figures in the pattern is determined by a lens characteristic of each of the cameras.

Based on the above, the calibration system of the multi-camera system of the invention captures the calibration image of the calibration board, analyzes the conventional features and the non-conventional feature from the calibration image, and uses the non-conventional feature as a reference feature to transform and matches the positions of the conventional features, thereby increasing a success rate of calibration, and the size of the calibration board may be increased to support feature matching of multiple cameras or multiple kinds of cameras.

BRIEF DESCRIPTION OF THE DRAWINGS

FIG. 4A to FIG. 4K are patterns of a calibration board according to an embodiment of the invention.

DESCRIPTION OF THE EMBODIMENTS

An embodiment of the invention is to change a pattern of a calibration board used in a calibration system for a multi-camera system, by adding a non-conventional feature as a mark in addition to conventional features, even if an effective conventional feature range of the calibration board is outside a calibration image field of view (FOV) of a camera, i.e., the calibration image field of view of the camera does not contain at least one conventional feature of the pattern, the cameras may also be rectified. The mark may be placed in the pattern of the calibration board in any form, for example, to change a color, shape, texture of one or more blocks or geometric figures in the pattern, or change a deployment method of the features, etc., which is not limited by the invention.

Figure 1A:
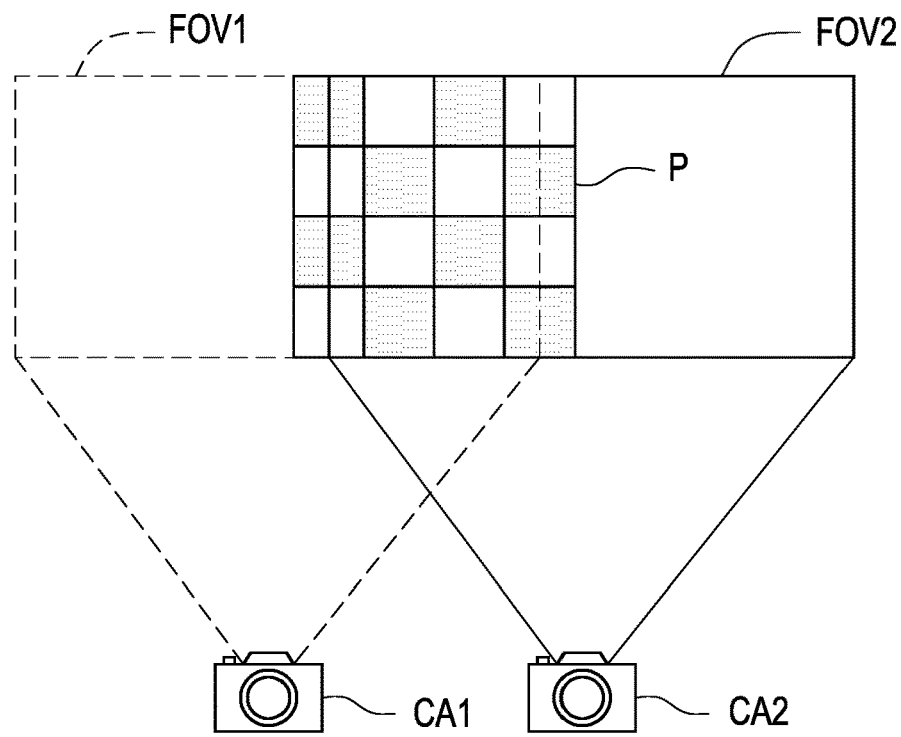
FIG. 1A and FIG. 1B are respectively schematic diagrams of an existing calibration method for a multi-camera system and a calibration board used therein.
Figure 1B:
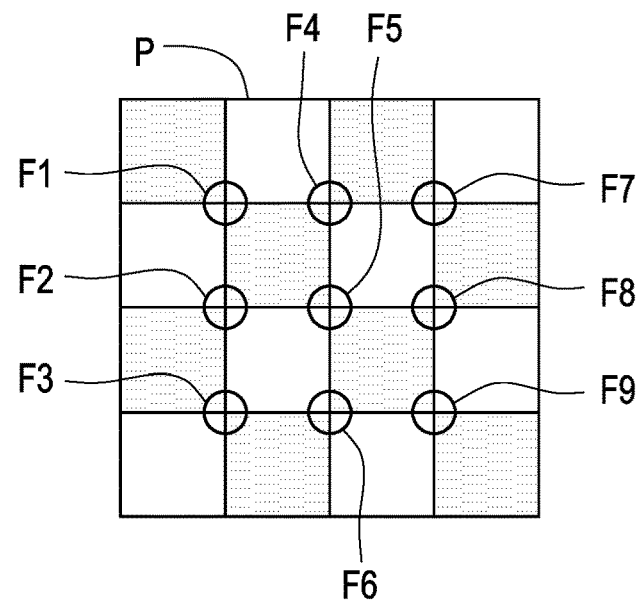
Figure 2:
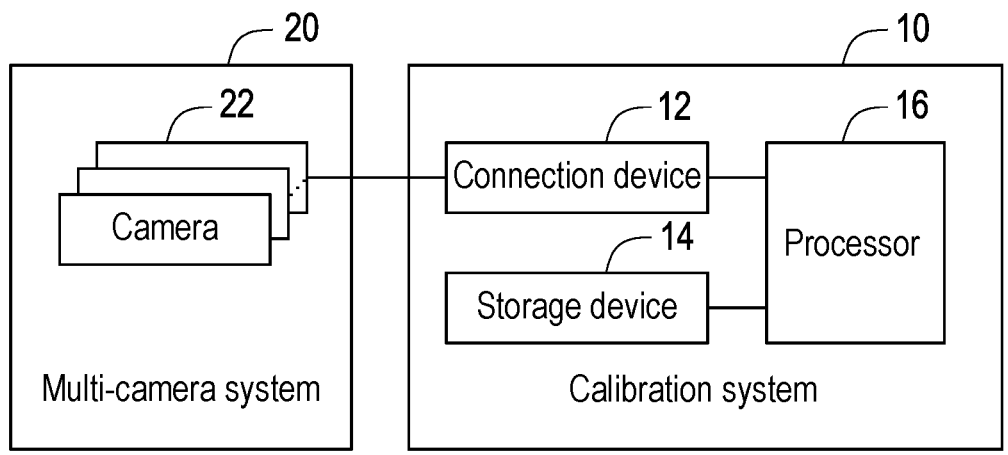
FIG. 2 is a block diagram of a calibration system for a multi-camera system according to an embodiment of the invention.

FIG. 2 is a block diagram of a calibration system for a multi-camera system according to an embodiment of the invention. Referring to FIG. 2, a calibration system 10 of the embodiment is, for example, a personal computer, a server, a workstation or other electronic devices with computing capabilities, and is used for calibrating multiple cameras 22 in a multi-camera system 20.

The multi-camera system 20 is, for example, a stereo camera, a panoramic camera, a depth-of-field camera, etc., that include the cameras 22. The cameras 22 may be cameras of a single system but including multiple sensors and corresponding lenses, or independent cameras of multiple systems, or any permutation and combination of the above. The camera 22 includes, for example, a charge coupled device (CCD), a complementary metal-oxide semiconductor (CMOS) device or other types of photosensitive devices, which may sense light intensity to generate images. In the embodiment, the cameras 22 are configured to capture calibration images of a calibration board (not shown), and provide the captured calibration images to the calibration system 10, and the calibration system 10 analyzes the calibration images to perform calibration on the cameras 22.

The calibration system 10 includes a connection device 12, a storage device 14 and a processor 16, and functions thereof are described as follows:

The connection device 12 is, for example, any wired or wireless interface device that may be connected to the cameras 22 to receive the calibration images captured by the cameras 22. Regarding the wired mode, the connection device 12 may be an interface such as a universal serial bus (USB), an RS232, a universal asynchronous receiver/transmitter (UART), an internal integrated circuit (I2C), a serial peripheral interface (SPI), a display port or a thunderbolt port, etc., but the invention is not limited thereto. Regarding the wireless mode, the connection device 12 may be a device supporting communication protocols such as wireless fidelity (Wi-Fi), RFID, bluetooth, infrared, near-field communication (NFC) or device-to-device (D2D), etc., but the invention is not limited thereto. In some embodiments, the connection device 12 may also include a network card that supports Ethernet or supports wireless network standards such as 802.11g, 802.11n, 802.11ac, etc., so that the calibration system 10 may be connected to the cameras 22 through a network, and is used to receive the calibration images captured by the cameras 22.

The storage device 14 is, for example, any type of fixed or removable random access memory (RAM), read-only memory (ROM), flash memory, hard disk or similar components or a combination of the above components, which is used for storing computer programs adapted to be executed by the processor 16. In some embodiments, the storage device 14 may also store the positions of the conventional features and the non-conventional feature detected by the processor 16 from the calibration images of the cameras 22.

The processor 16 is, for example, a central processing unit (CPU), or other programmable general purpose or special purpose microprocessor, microcontroller, digital signal processor (DSP), programmable controller, application specific integrated circuits (ASIC), programmable logic device (PLD) or other similar devices or a combination of these devices, which is not limited by the embodiment. In the embodiment, the processor 16 may load a computer program from the storage device 14 to execute the calibration method for the multi-camera system according to the embodiment of the invention.

Figure 3:
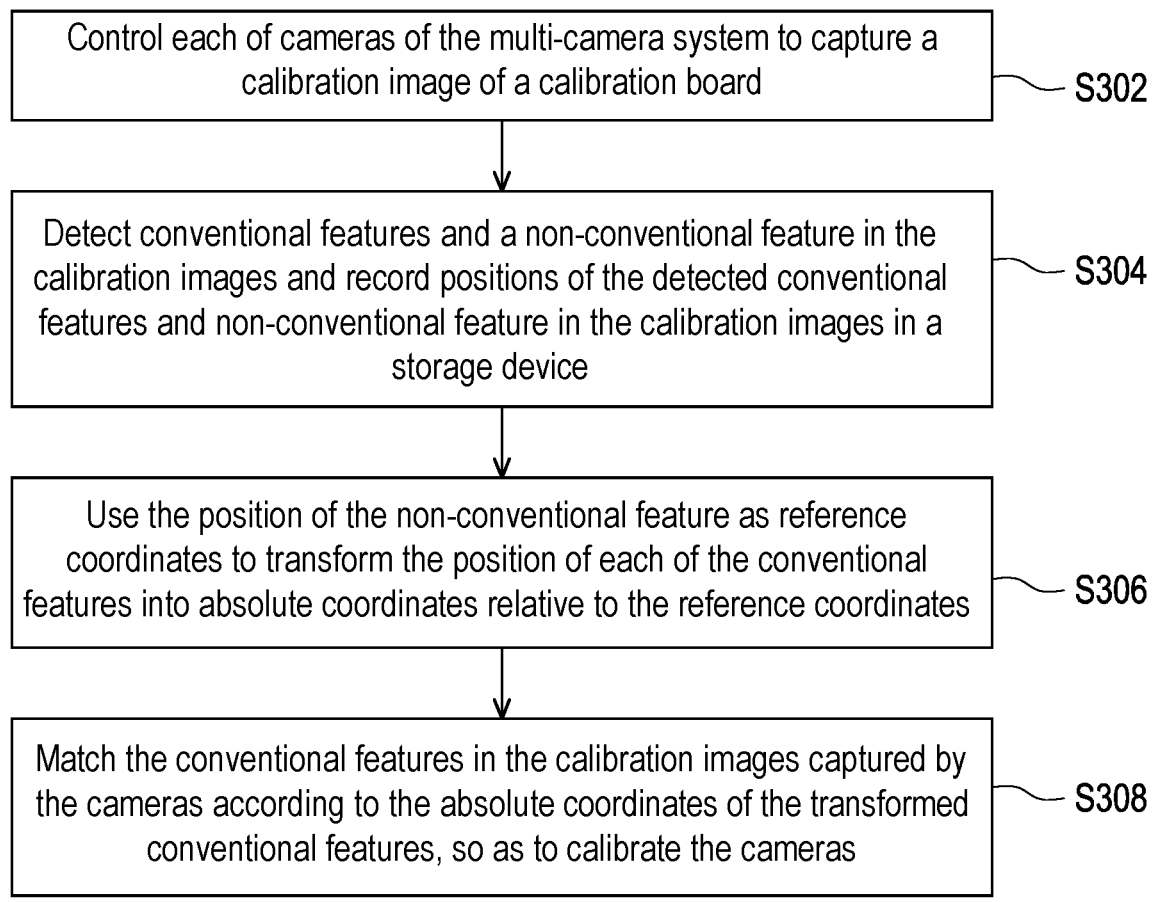
FIG. 3 is a flowchart of a calibration method for a multi-camera system according to an embodiment of the invention.

FIG. 3 is a flowchart of a calibration method for a multi-camera system according to an embodiment of the invention. Referring to FIG. 2 and FIG. 3 at the same time, the method of the embodiment is applicable to the above-mentioned calibration system 10, and detailed steps of the calibration method of the embodiment will be described below with reference of various components of the calibration system 10.

In step S302, the processor 16 controls each camera 22 of the multi-camera system 20 to capture a calibration image of a calibration board. The calibration board has a pattern including multiple conventional features and at least one non-conventional feature, and a field of view of the calibration image of at least one camera 22 does not contain at least one conventional feature of the pattern.

In step S304, the processor 16 detects the conventional features and the non-conventional feature in the calibration images and records positions of the conventional features and the non-conventional feature in the storage device 14. Where, the processor 16, for example, identifies the conventional features through an algorithm, and identifies the non-conventional feature through another algorithm.

In some embodiments, the pattern of the calibration board is a checkerboard formed by multiple blocks of different colors arranged in interleaving, and the conventional features are intersections of the blocks. Where, the processor 16, for example, detects a form of each block in the checkerboard, so as to identify at least one block with the form changed as the non-conventional feature. The form includes at least one of color, brightness, shape, texture, presence/absence and density.

For example, FIG. 4A to FIG. 4K are patterns of a calibration board according to an embodiment of the invention. In FIG. 4A, a color of a block B1 of a black and white checkerboard is changed to red to serve as the non-conventional feature, and in FIG. 4B, a color of a block B2 in the checkerboard is changed to green to serve as the non-conventional feature. Thus, by changing a color or brightness of at least one block in the checkerboard, the calibration system may detect the non-conventional feature by identifying the color.

FIG. 4C is to add a notch on an edge of a block B3 in the checkerboard to serve as the non-conventional feature, and FIG. 4D is to change a block B4 in the checkerboard to a pass-through graphic to serve as the non-conventional feature, and FIG. 4E is to add a notch on an edge of a block B5 in the checkerboard formed by multiple blocks of different colors arranged in interleaving to serve as the non-conventional feature. In this way, by changing a shape of at least one block in the checkerboard, the calibration system may detect the non-conventional feature by identifying the shape.

FIG. 4F is to add a character A in a block B6 of the checkerboard to serve as the non-conventional feature, and FIG. 4G is to change a texture of a block B7 of the checkerboard into a honeycomb to serve as the non-conventional feature, FIG. 4H is to add a three-point figure in a block B8 of the checkerboard to serve as the non-conventional feature, FIG. 4I is to add a triangle in a block B9 of the checkerboard to serve as the non-conventional feature, FIG. 4J is to add a red triangle in a block B10 of the checkerboard to serve as the non-conventional feature, and FIG. 4K is to add a slash in a block B11 of the checkerboard to serve as the non-conventional feature. In this way, by changing a texture of at least one block in the checkerboard, the calibration system may detect the non-conventional feature by recognizing the texture.

Figure 5A:
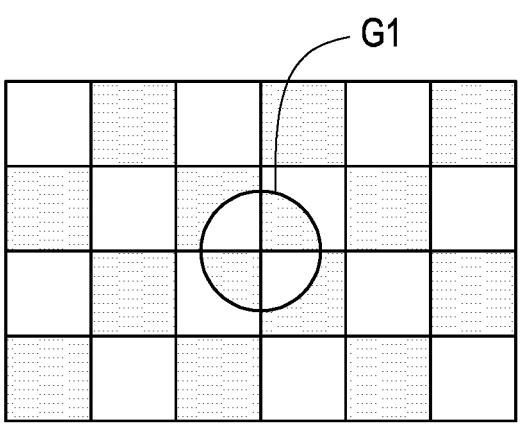
FIG. 5A to FIG. 5F are patterns of a calibration board according to an embodiment of the invention.
Figure 5B:
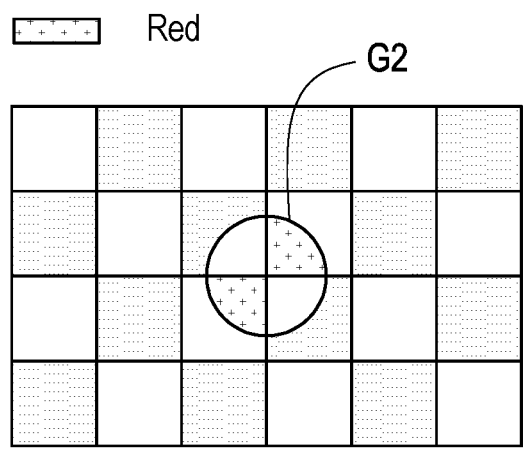
Figure 5C:
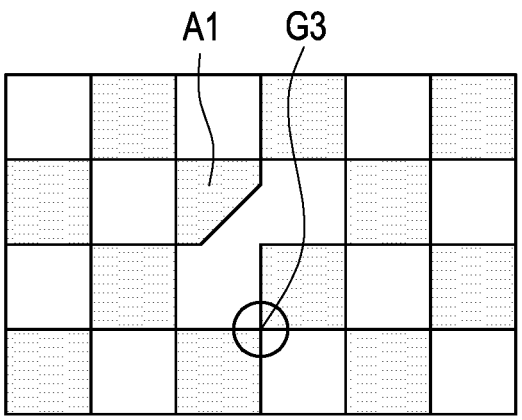
Figure 5D:
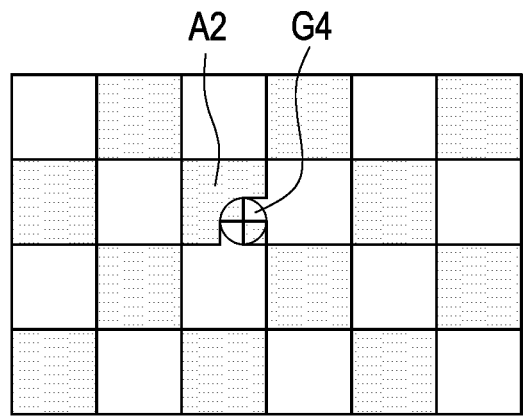
Figure 5E:
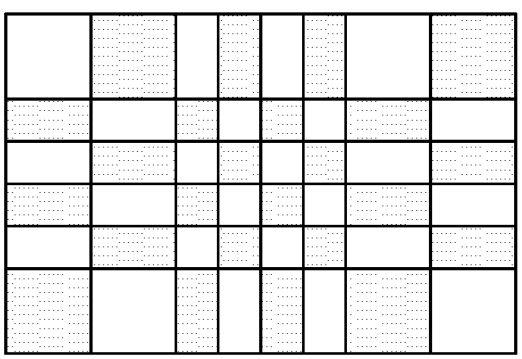
Figure 5F:
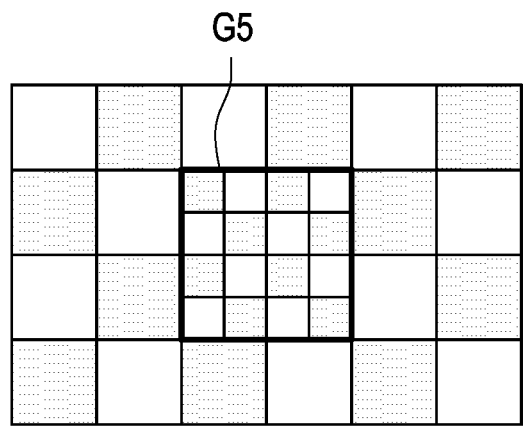

FIG. 5A to FIG. 5F are patterns of a calibration board according to an embodiment of the invention. FIG. 5A is to change shapes and colors (white to black, black to white) of blocks in a circular area G1 of the checkerboard to serve as the non-conventional feature, FIG. 5B is to change shapes and colors (white to red, black to white) of blocks in a circular area G2 of the checkerboard to serve as the non-conventional feature, FIG. 5C is to change a shape (to cut a lower right corner) of a block A1 of the checkerboard to serve as the non-conventional feature, FIG. 5D is to change a shape of a block A2 (a lower right corner is changed to a smaller checkerboard) of the checkerboard to serve as the non-conventional feature, FIG. 5E is to change a density of the blocks in the checkerboard to serve as the non-conventional feature, and FIG. 5F is to change a density of blocks in a central area G5 (to checkerboard with a smaller size) of the checkerboard to serve as the non-conventional feature.

In some embodiments, the processor 16, for example, detects a form of each block in the checkerboard to identify the conventional feature added or deleted due to the change of the form of at least one block as the non-conventional feature. The form includes at least one of shape, texture, presence/absence and density.

For example, in the checkerboard of FIG. 5C, the conventional feature originally in the area G3 is deleted due to a shape change of the block A1, while in the checkerboard of FIG. 5D, a conventional feature is added in the area G4 due to a shape change of the block A2, in the checkerboards of FIG. 5E and FIG. 5F, the numbers of the conventional features are increased due to the increase of block densities. Therefore, by detecting the increase or decrease in the number of the conventional features in the checkerboard, the calibration system may detect the non-conventional feature by identifying the added or deleted conventional features.

In other embodiments, the pattern of the calibration board is multiple geometric figures arranged according to a predetermined rule, and the conventional features are the geometric figures themselves. The geometric figures are, for example, circles, triangles, squares, other polygons, or figures of any other shape, and the predetermined rule is, for example, interleaving arrangement, parallel arrangement, and other arrangements, which is not limited by the invention. Where, the processor 16, for example, detects the form of each geometric figure in the pattern of the calibration board, so as to identify at least one geometric figure with a changed form as the non-conventional feature. The form includes at least one of color, shape, texture, presence/absence and density.

Figure 6A:
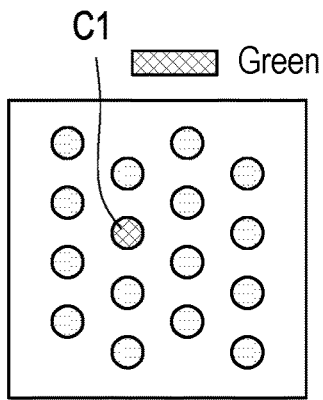
FIG. 6A to FIG. 6N are patterns of a calibration board according to an embodiment of the invention.
Figure 6B:
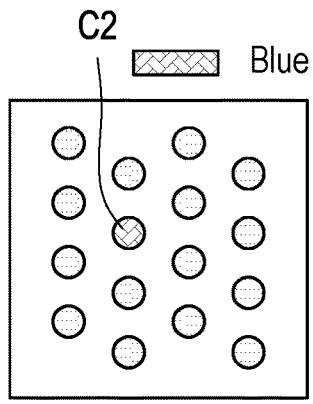
Figure 6C:
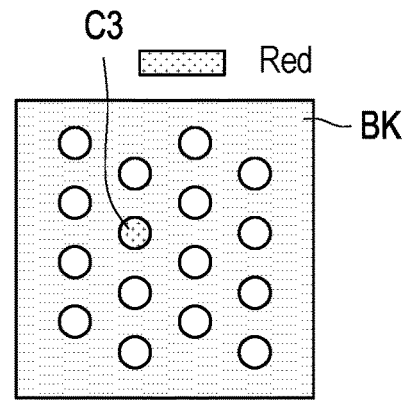
Figure 6D:
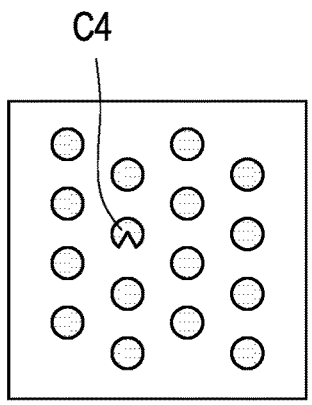
Figure 6E:
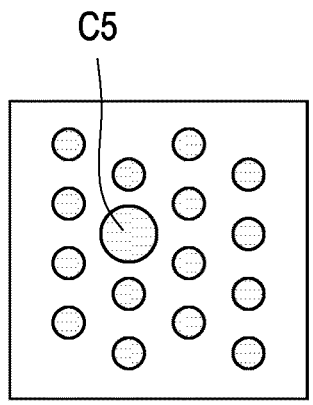
Figure 6F:
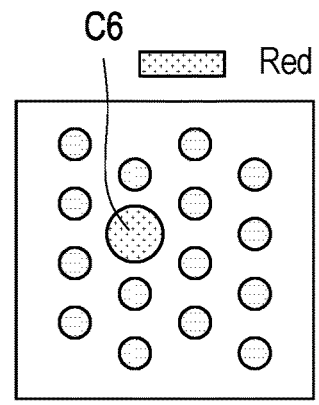
Figure 6G:
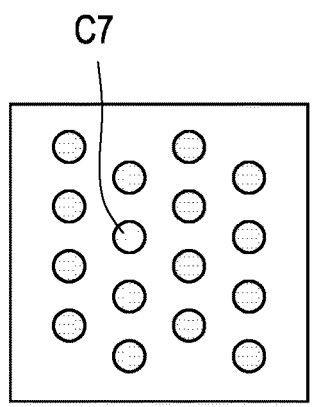
Figure 6H:
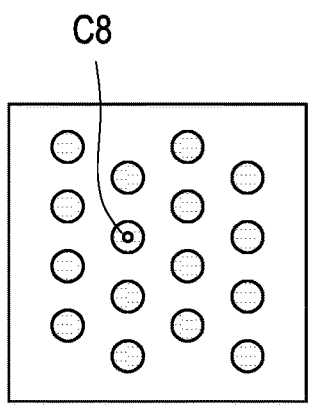
Figure 6I:
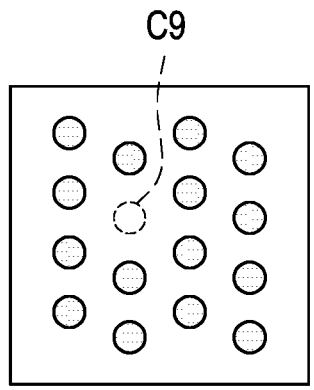
Figure 6J:
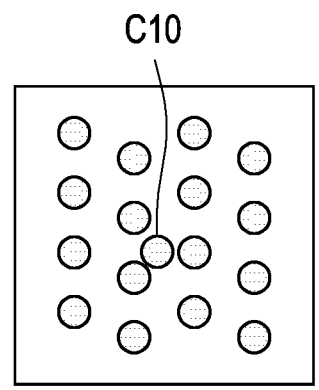
Figure 6K:
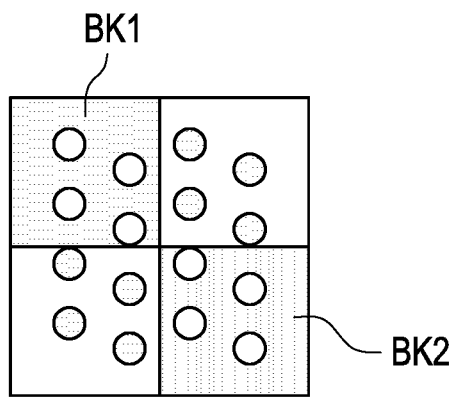
Figure 6L:
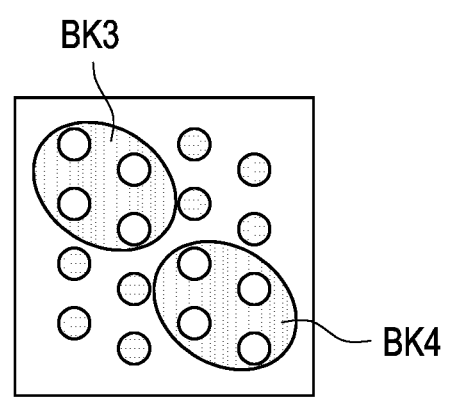
Figure 6M:
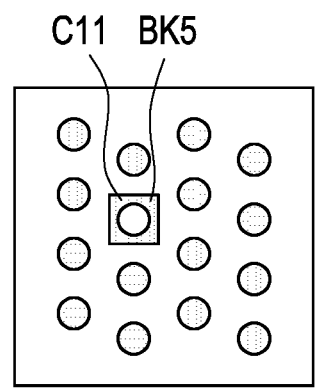
Figure 6N:
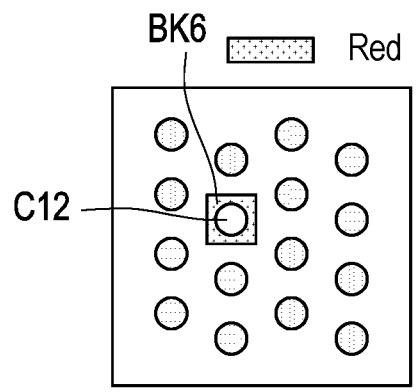

For example, FIG. 6A to FIG. 6N are patterns of a calibration board according to an embodiment of the invention. FIG. 6A is to change a color of a circle C1 among multiple circles (black) arranged in interleaving to green to serve as the non-conventional feature, and FIG. 6B is to change a color of a circle C2 among multiple circles arranged in interleaving to blue to serve as the non-conventional feature, and FIG. 6C is an inverted form of the pattern shown in FIG. 6A, and is to change a color of a circle C3 therein to read to serve as the non-conventional feature. In this way, by changing a color or brightness of at least one geometric figure in the pattern of the calibration board, the calibration system may detect the non-conventional feature by identifying the color.

FIG. 6D is to increase a notch on an edge of a circle C4 to serve as the non-conventional feature, FIG. 6E is to increase a size of a circle C5 to serve as the non-conventional feature, and FIG. 6F is to increase a size of a circle C6 and change a color thereof to red to serve as the non-conventional feature. In this way, by changing a shape of at least one geometric figure in the pattern of the calibration board, the calibration system may detect the non-conventional feature by identifying the shape.

FIG. 6G is to increase a brightness of a circle C7 to serve as the non-conventional feature, and FIG. 6H is to add another circle in a circle C8 to serve as the non-conventional feature. Therefore, by changing a texture of at least one geometric figure in the pattern of the calibration board, the calibration system may detect the non-conventional feature by identifying the texture.

FIG. 6I is to delete a circle C9 to serve as the non-conventional feature, and FIG. 6J is to add an additional circle C10 to serve as the non-conventional feature. Therefore, by changing the number of the conventional features in the pattern of the calibration board, the calibration system may detect the non-conventional feature by detecting the increase or decrease of the conventional features.

In some embodiments, processor 16 may, for example, detect a form of a background around at least one geometric figure in the pattern of the calibration board to identify the form-changed background as the non-conventional feature. The form includes at least one of color, shape, size and texture.

FIG. 6K is to equally divide a pattern of a calibration board into four areas, and change a background BK1 of an upper left area to black (and meanwhile change the circles therein to white), and change a background BK2 of a lower right area to black (and meanwhile change the circles therein to white) to serve as the non-conventional feature. FIG. 6L is to change a background BK3 of an elliptical area surrounding the upper left four circles in the pattern of the calibration board to black (and meanwhile change the circles therein to white), and change a background BK4 of an elliptical area surrounding the lower right four circles to black (and meanwhile change the circles therein to white). FIG. 6M is to change a background BK5 around a circle C9 in the pattern of the calibration board to black (and meanwhile change the circle C9 to white), and FIG. 6N is to change a background BK6 around a circle C10 in the pattern of the calibration board to red (and meanwhile change the round C10 to white). Therefore, by changing a color of a background around at least one geometric figure in the pattern of the calibration board, the calibration system may detect the non-conventional feature by identifying a background color.

In some embodiments, the calibration board may be combined with the above two patterns of checkerboard and geometric figures, and the calibration system may detect the conventional features by identifying one pattern, and detect the non-conventional feature by identifying the other pattern. Where, the processor 16 may identify a geometrical figure disposed at the position of at least one conventional feature of the checkerboard as the non-conventional feature, or identify the checkerboard disposed at the position of at least one geometric figure among multiple sequentially arranged geometric figures as the non-conventional feature.

Figure 7A:
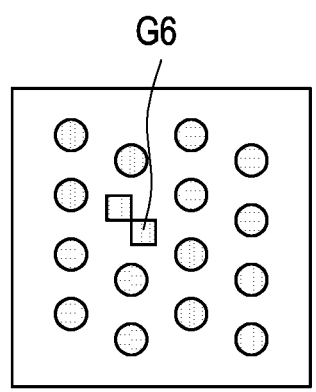
FIG. 7A and FIG. 7B are patterns of a calibration board according to an embodiment of the invention.
Figure 7B:
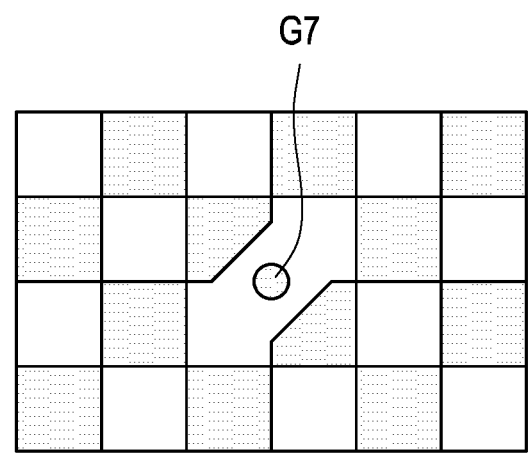

For example, FIG. 7A and FIG. 7B are patterns of a calibration board according to an embodiment of the invention. FIG. 7A is to select a circle in a pattern formed by multiple circles and configure a checkerboard graphic G6 on the position thereof, and FIG. 7B is to configure a circle G7 at a position (i.e. an intersection of the blocks) of a conventional feature of a checkerboard (and meanwhile change shapes of the surrounding black blocks to highlight the circle G7). Therefore, by combining the two patterns as the pattern of the calibration board, the calibration system may respectively detect the conventional features and the non-conventional feature by identifying the two patterns.

Figure 8A:
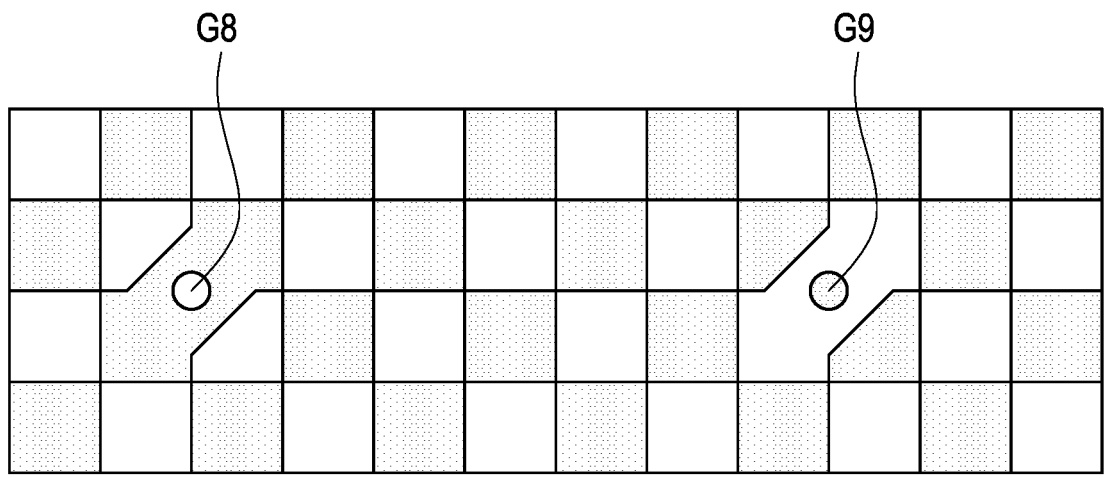
FIG. 8A to FIG. 8D are patterns of a calibration board according to an embodiment of the invention.
Figure 8B:
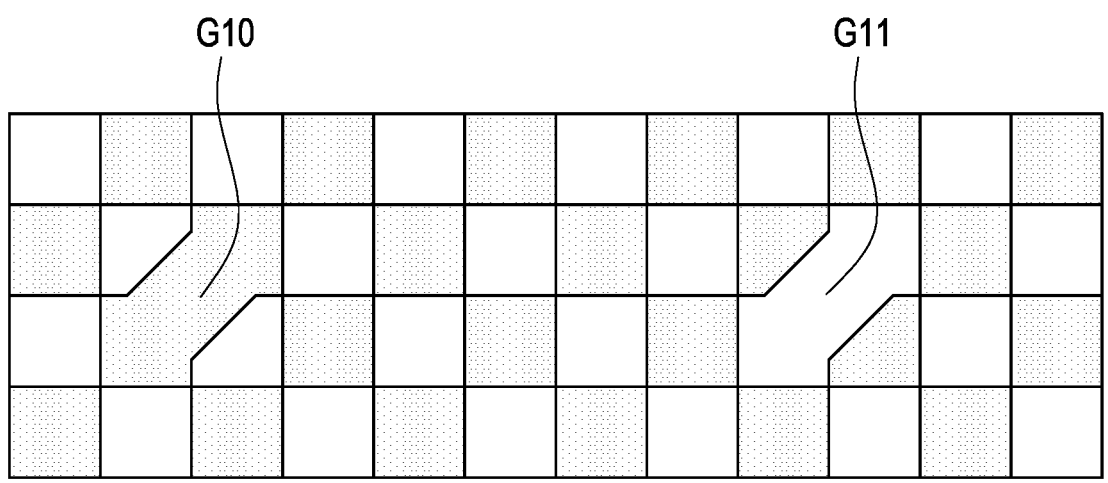
Figure 8C:
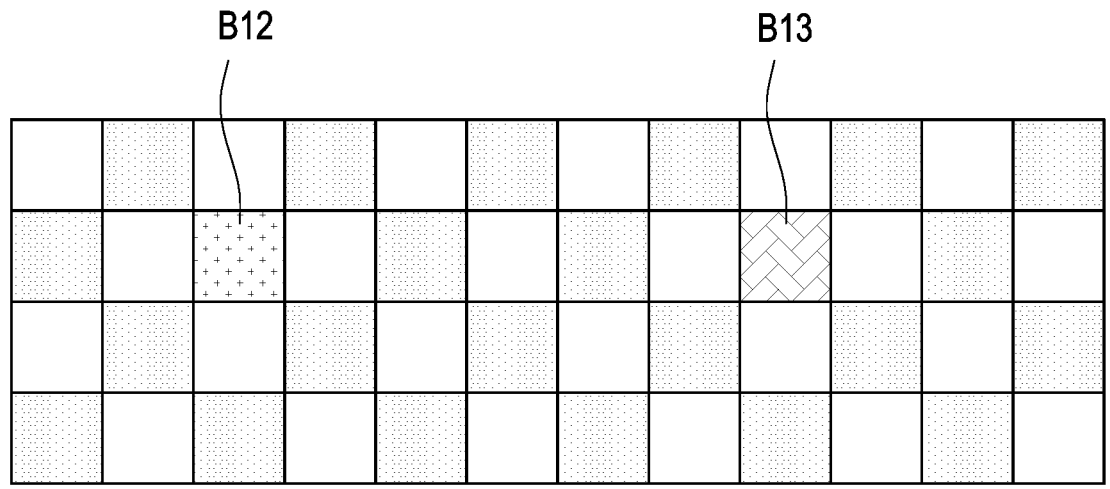
Figure 8D:
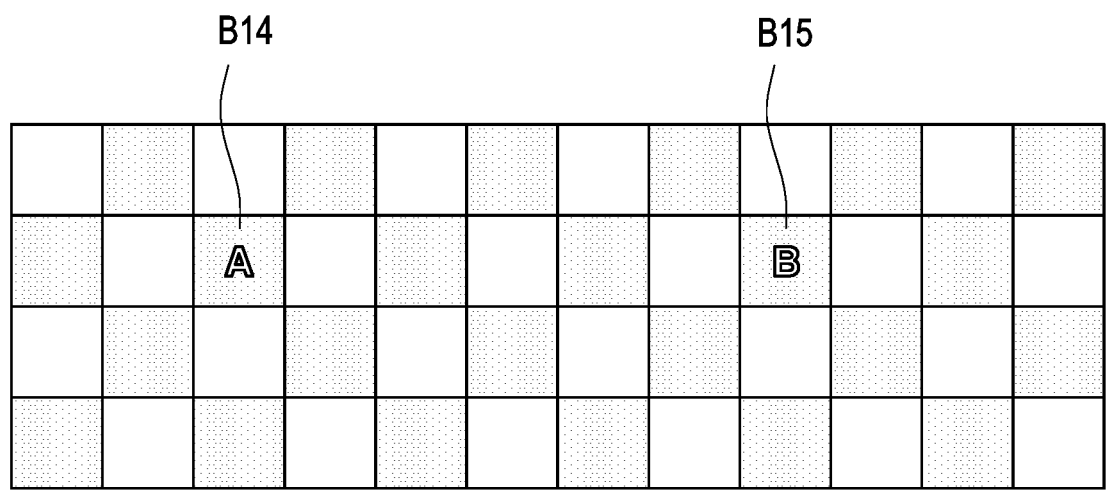

In some embodiments, the non-conventional feature configured in the pattern of the calibration board is not limited to one. For example, FIG. 8A to FIG. 8D are patterns of a calibration board according to an embodiment of the invention. FIG. 8A is to arrange circles G8 and G9 at positions of two different conventional features (i.e., the intersections of the blocks) in the checkerboard (and meanwhile change shapes of the surrounding black or white blocks to highlight the circles G8 and G9). FIG. 8B is to change shapes of a black block G10 and a white block G11 around the positions of two different conventional features in the checkerboard, so that these two conventional features disappear (not shown in the image). FIG. 8C is to change colors of two different blocks B12 and B13 in the checkerboard, and FIG. 8D is to add characters in two different blocks B14 and B15 in the checkerboard.

Therefore, even if one or more of the non-conventional features disappear (not seen in the calibration image) due to that the camera 22 is occluded or not in the field of view of the calibration image of the camera 22, the processor may still complete calibration of the camera 22 through other non-conventional features.

In some embodiments, the processor may estimate a position of a next conventional feature according to the positions of the conventional features arranged in sequence, and determine that the estimated position includes a deleted conventional feature when no conventional feature is detected around the estimated position. Conversely, if a conventional feature is detected around the estimated position, the processor may determine whether the detected conventional feature is an added additional feature according to an error between the position of the detected conventional feature and the estimated position.

Figure 9A:
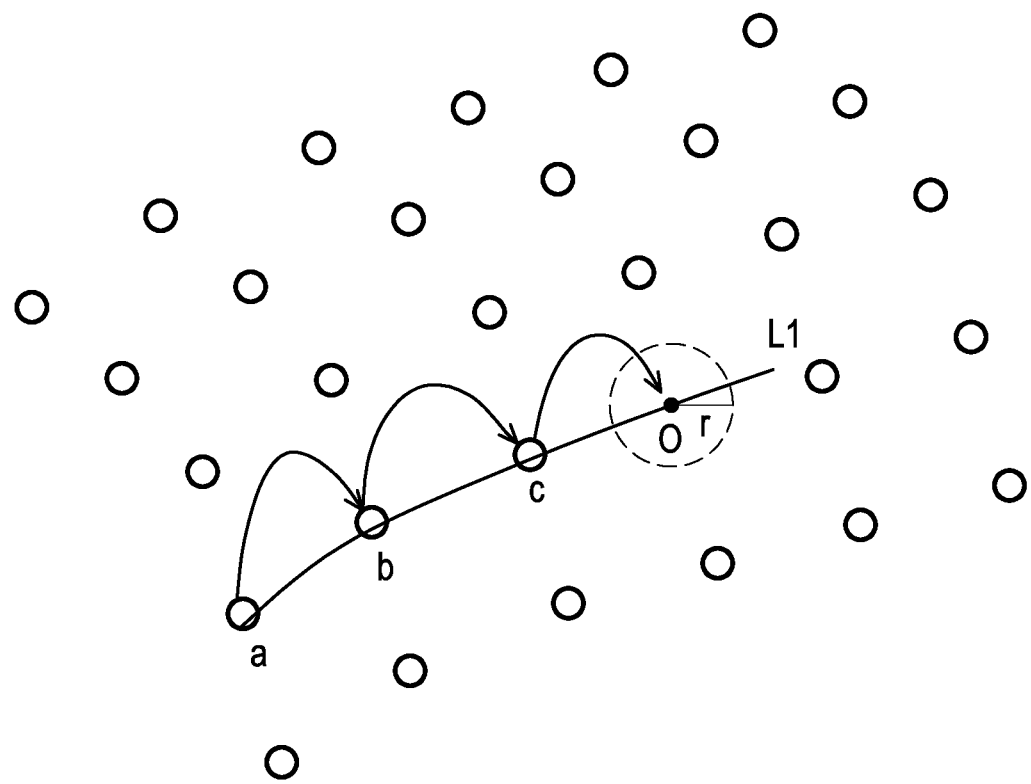
FIG. 9A is an example of detecting a deleted feature according to an embodiment of the invention.
Figure 9B:
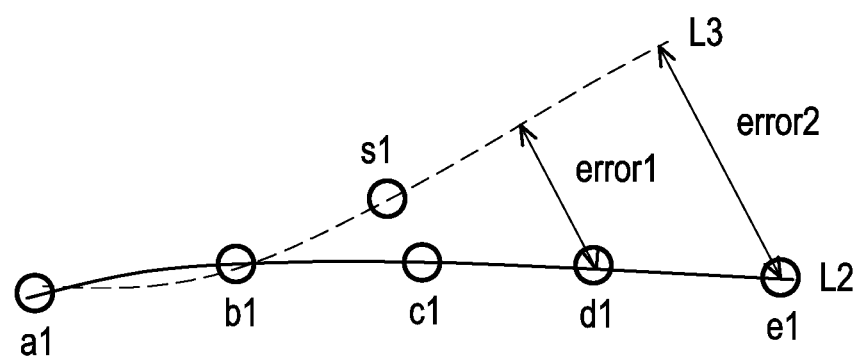
FIG. 9B is an example of detecting an additional feature according to an embodiment of the invention.

In detail, FIG. 9A is an example of detecting a deleted feature according to an embodiment of the invention, and FIG. 9B is an example of detecting an additional feature according to an embodiment of the invention. In an actual situation, the conventional features in the calibration image captured by the camera may have a deviation due to factors such as camera rotation and/or lens distortion, and are not deployed in specified positions before the calibration. At this point, polynomial regression, machine learning, etc., may be used to predict a position of a next feature by using known features.

Referring to FIG. 9A, the embodiment uses high-order one-dimensional prediction to predict a trajectory L1 according to positions of known feature points a, b, and c, and uses a span between the feature points a, b, and c to predict a position O of a next feature point. When the predicted position O is obtained, a circular range may be set by taking the position O as a center and r as a radius, so as to search for features within the circular range. If no feature is found within the circular range, it may be identified that there is a deleted feature at the position O. In other embodiments, high-order two-dimensional prediction and other methods may also be used in search of features, which is not limited by the invention.

On the other hand, regarding additional features, since the features may interfere with the existing conventional features, it is required to obtain approximate positions thereof by detecting a feature density, and then measure prediction errors (cost) to take the features with the lowest error as the conventional features, and take the others as the non-conventional features (i.e., additional feature). In some embodiments, if the approximate positions of the additional features cannot be found, it is necessary to determine the cost of all the features to obtain the additional features.

Referring to FIG. 9B, in the embodiment, through density detection, it may be known that feature points c1 and s1 may be additional features. At this time, a predicted trajectory L2 may be obtained by using the feature points a1, b1, and c1, and a predicted trajectory L3 may be obtained by using the feature points a1, b1, and s1. Since errors error1 and error2 between other feature points d1, e1 and the predicted trajectory L3 are obviously larger than errors between the feature points d1, e1 and the predicted trajectory L2, it may be determined that the feature point c1 is a conventional feature, and the feature point s1 located in the predicted trajectory L3 is an additional feature.

In the above embodiments, the calibration board is flat, but if a wider angle (for example, a 180-degree fisheye) is to be used, any non-planar calibration board may be used.

Figure 10:
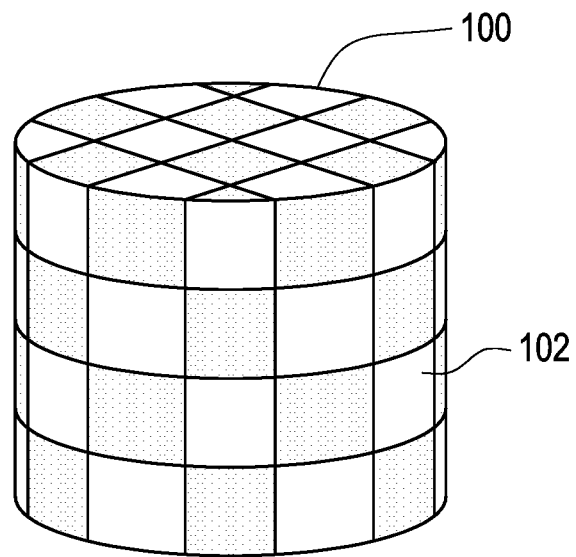
FIG. 10 and FIG. 11 are schematic diagrams of three-dimensional calibration boards according to an embodiment of the invention.
Figure 11:
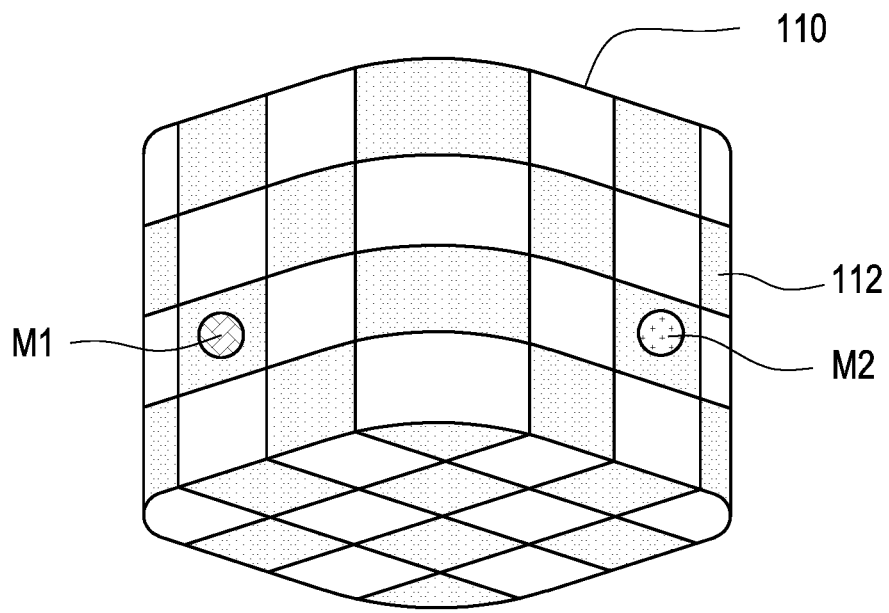

For example, FIG. 10 and FIG. 11 are schematic diagrams of three-dimensional calibration boards according to an embodiment of the invention. Referring to FIG. 10, a calibration board 100 is cylindrical, and inner surfaces of a top surface and a side surface thereof have a pattern 102 of a checkerboard. The multi-camera system (not shown) to be calibrated may be placed in the calibration board 100 for capturing a calibration image of 360 degrees of the pattern 102. Based on the fact that the position of each feature in the pattern 102 is well-defined, it is possible to add marks to the pattern 102 so that the calibration system knows which pairs of features match. In other embodiments, the calibration board may also adopt non-planar shapes such as semi-cylindrical, spherical, hemispherical, cubic, etc.

Referring to FIG. 11, the calibration board 110 is in a shape of a cube with rounded corners, and inner surfaces of a side surface and a bottom surface thereof have a checkerboard pattern. By arranging marks M1 and M2 of different colors on different surfaces of the calibration board 110 as the non-conventional features, the marks M1 or M2 may be seen in the calibration images captured by each of the cameras of the multi-camera system, and based on the fact that the position of each feature is clearly defined in the checkerboard pattern of the calibration board 110, hints of extrinsic parameters of the cameras may be obtained through the mark M1 or M2.

Referring back to the flow of FIG. 3, in step S306, the processor 16 uses the position of the non-conventional feature as reference coordinates to transform the position of each conventional feature into absolute coordinates relative to the reference coordinates.

Figure 12A:
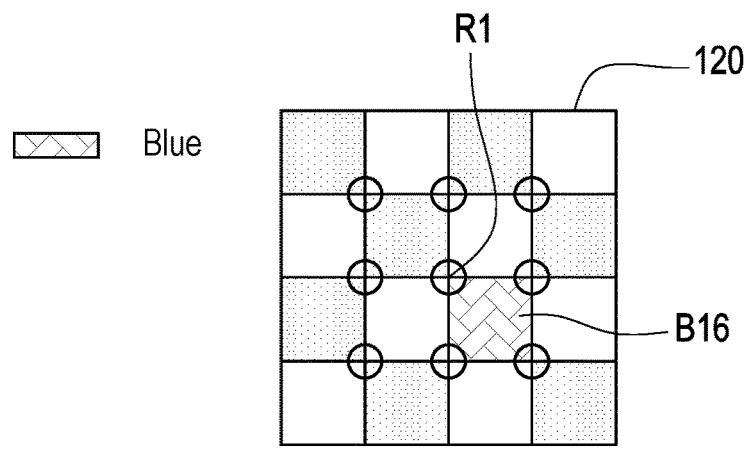
FIG. 12A to FIG. 12E are examples of transforming positions of conventional features by using a position of a non-conventional feature according to an embodiment of the invention.
Figure 12B:
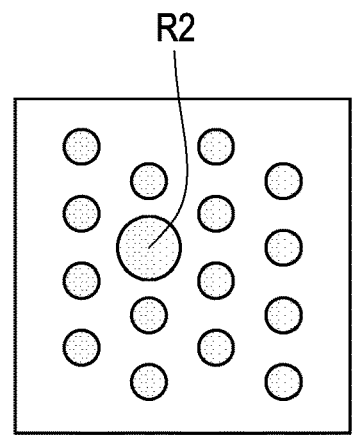
Figure 12C:
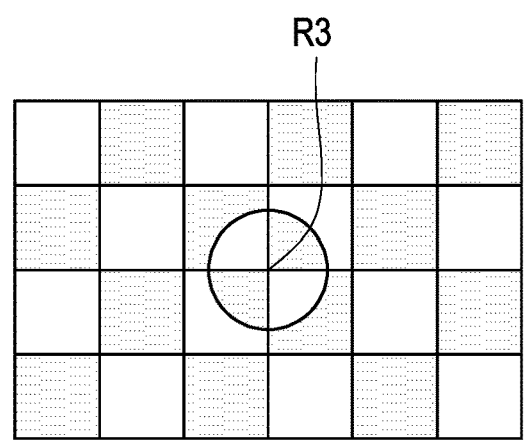

In detail, FIG. 12A to FIG. 12E are examples of transforming positions of conventional features by using a position of a non-conventional feature according to an embodiment of the invention. Referring to FIG. 12A, based on the fact that positions of all features in the pattern of a calibration board 120 in a three-dimensional space have been clearly defined, it is assumed that the calibration board 120 is planar, and a block B16 may be identified as a non-conventional feature by detecting a color of the block B16. At this time, an intersection of an upper left corner of the block B16 and other blocks may be used as a reference feature R1, and a position of the reference feature R1 may be used as reference coordinates (0,0,1) in a three-dimensional space (x, y, z). It is assumed that a width of the block is 0.3, absolute coordinates of a left feature thereof are (−0.3,0,1), and absolute coordinates of a right feature thereof are (0.3,0,1). Where, if the calibration board 120 is not planar, z values of the absolute coordinates of other features may be changed.

In FIG. 12A, the non-conventional feature (i.e., the block B16) itself is not a conventional feature. At this time, it is required to define a specific position on the non-conventional feature as the reference feature R1 based on a relationship between the non-conventional feature and the conventional features. Comparatively, in FIG. 12B, the non-conventional feature (i.e., a center of the largest circle) itself is a conventional feature, so that the non-conventional feature may be directly defined as a reference feature R2. Similarly, in FIG. 12C, a non-conventional feature (i.e., a circle) contains a conventional feature (i.e., an intersection of the blocks), so that the conventional feature within the non-conventional feature may be directly defined as a reference feature R3.

Figure 12D:
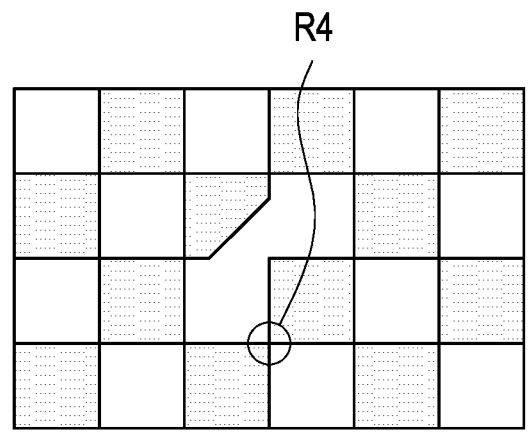
Figure 12E:
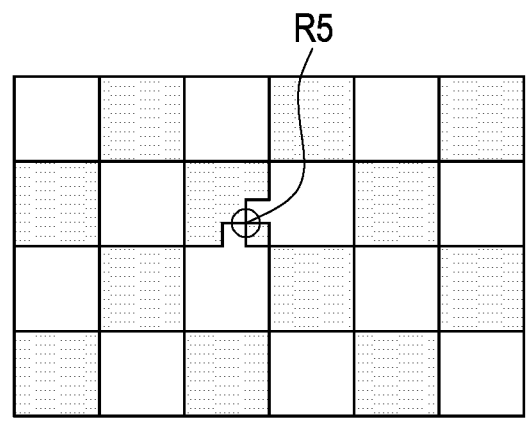

In FIG. 12D, the non-conventional feature (i.e., the central deleted conventional feature) will change the number of the conventional features, so that one of the conventional features next to the deleted conventional feature may be defined as a reference feature R4, and in FIG. 12E, a non-conventional feature (i.e., a small checkerboard added in the center) will change the number of the conventional features, so that the newly added conventional feature may be defined as a reference feature R5.

Referring back to the flow of FIG. 3, in step S308, the processor 16 matches the conventional features in the calibration images captured by the cameras 22 according to the absolute coordinates of the transformed conventional features, so as to calibrate the cameras 22.

In this way, even if the calibration image captured by any camera 22 in the multi-camera system 10 does not contain all of the conventional features, the processor 16 may still obtain the positions of the conventional features by detecting the non-conventional feature, and implement calibration of the cameras 22 by matching the conventional features.

In some embodiments, the processor 16 may calculate the extrinsic parameters of the cameras 22 by using multiple conventional features matched with each other in the calibration images captured by the cameras 22. In other embodiments, the processor 16 may use multiple conventional features in the calibration image captured by each camera 22 to calculate intrinsic parameters of the cameras 22.

Figure 13:
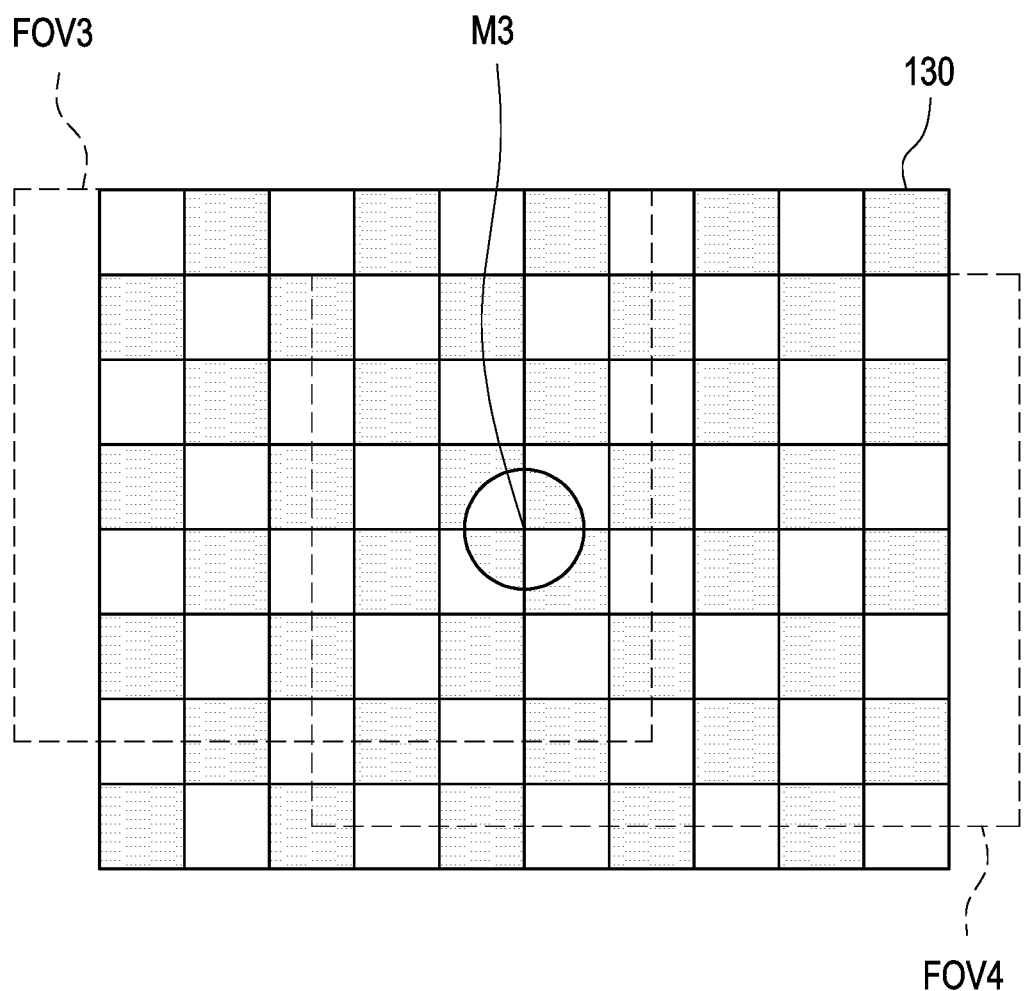
FIG. 13 is an example of using a calibration board to calibrate cameras according to an embodiment of the invention.

In detail, FIG. 13 is an example of using a calibration board to calibrate cameras according to an embodiment of the invention. Referring to FIG. 13, FOV3 and FOV4 represent fields of view of two cameras of the multi-camera system when capturing calibration images of a calibration board 130. Where, since the fields of view FOV3 and FOV4 only respectively cover a part of the pattern of the calibration board 130, the calibration system cannot know a corresponding relationship of the features thereof from the calibration images captured by the two cameras. However, by adding a mark M3 to the pattern of the calibration board 130 in the embodiment of the invention, the calibration system may use the mark M3 as a reference feature to obtain feature pairs matched in the two calibration images, thereby calibrating the two cameras.

Figure 14:
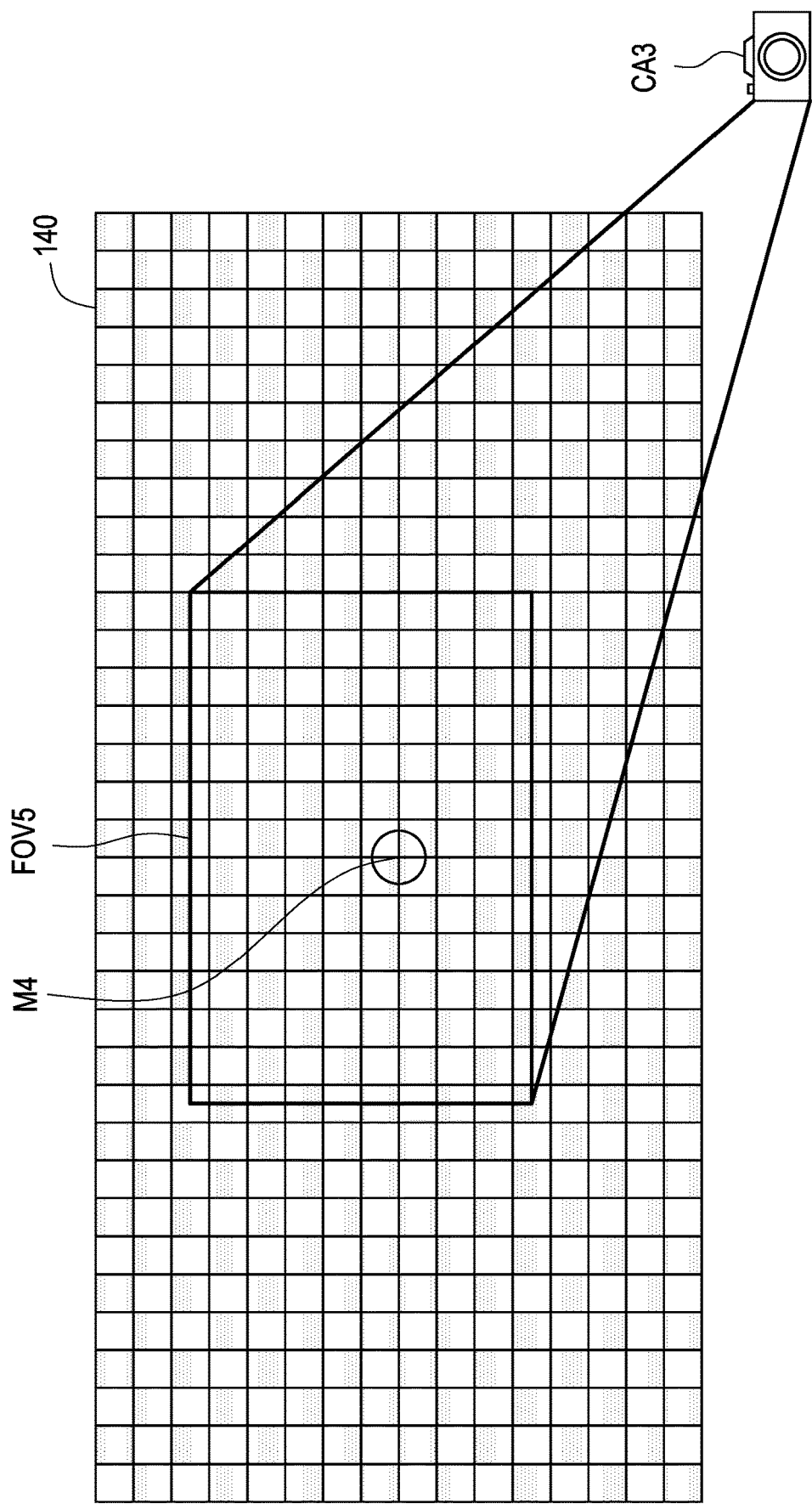
FIG. 14 and FIG. 15 are examples of using a super-large calibration board to calibrate cameras according to another embodiment of the invention.
Figure 15:
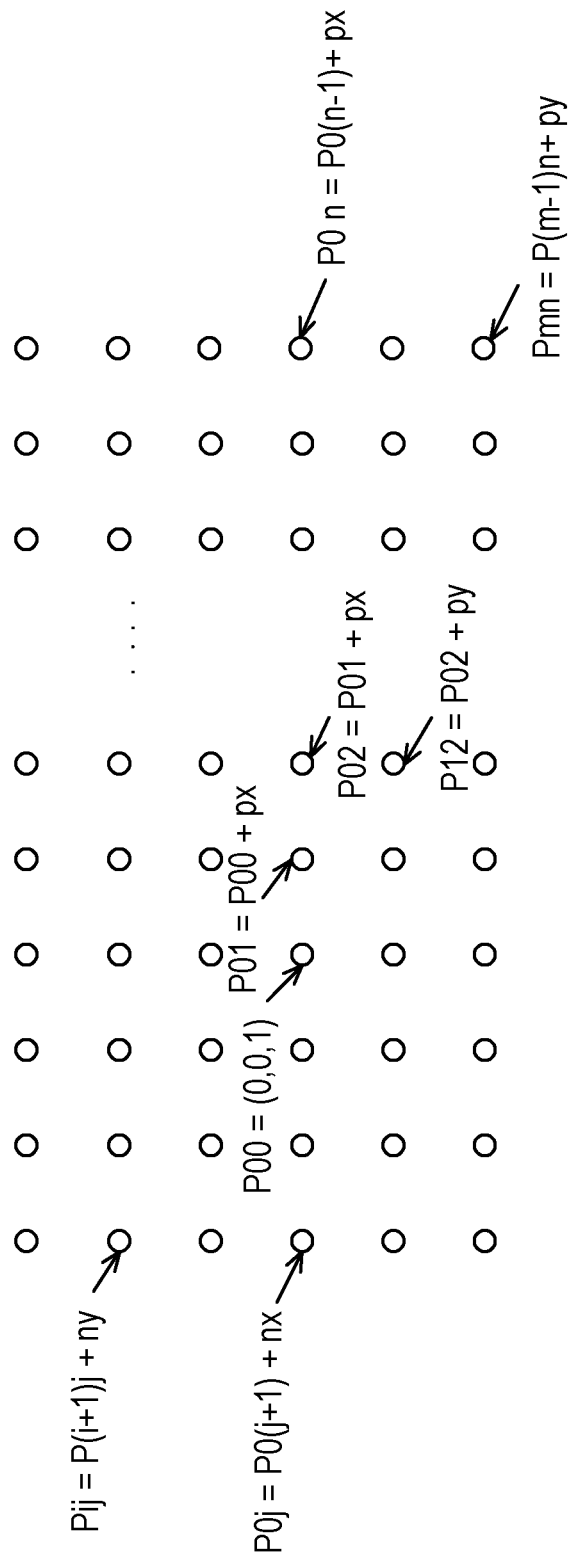

FIG. 14 and FIG. 15 are examples of using a super-large calibration board to calibrate cameras according to another embodiment of the invention. Referring to FIG. 14, a calibration board 140 has a pattern of a super large size, and may cover a field of view FOV5 of a camera CA3. Where, by adding a mark M4 into the pattern of the calibration board 140, the calibration system may use the mark M4 as a reference feature to calibrate the camera CA3. Since there is the reference feature that may be used as a reference, there is no need to worry about whether the size of the pattern or the number of the features is too large, and various materials such as paper, plastic, and light-emitting diodes (LED) may be freely used to make the calibration board 140, and in the pattern of the super large size, the calibration system may still obtain features from the calibration board as wide as possible.

In detail, multiple dots in FIG. 15 represent the features obtained from the calibration image captured by the camera CA3, where P00=(0,0,1) is coordinates of the position of the mark M4. By setting P00 as coordinates of the reference feature, absolute coordinates of other features in the captured calibration image in the three-dimensional (3D) space may be calculated. Where, an accumulation method may be used for a conventional pattern (features are distributed with a fixed density). Based on predefined directions, position units in each direction are known. For example, regarding px, py, nx, and ny in FIG. 15, if the pattern is three-dimensional, additional pz and nz may be added, where p represents a positive number and n represents a negative number. In some embodiments, multiplication may also be used for the conventional pattern, i.e., absolute coordinates of a feature Pij are (a*px, b*py, 1).

On the other hand, for a non-conventional pattern (i.e., a feature density is not fixed), a look-up table or formula may be used to obtain the three-dimensional coordinates of the features. For the pattern with multiple non-conventional features, the calibration system must learn three-dimensional coordinates of each non-conventional feature to calibrate the camera that captures the image of the non-conventional feature.

Figure 16:
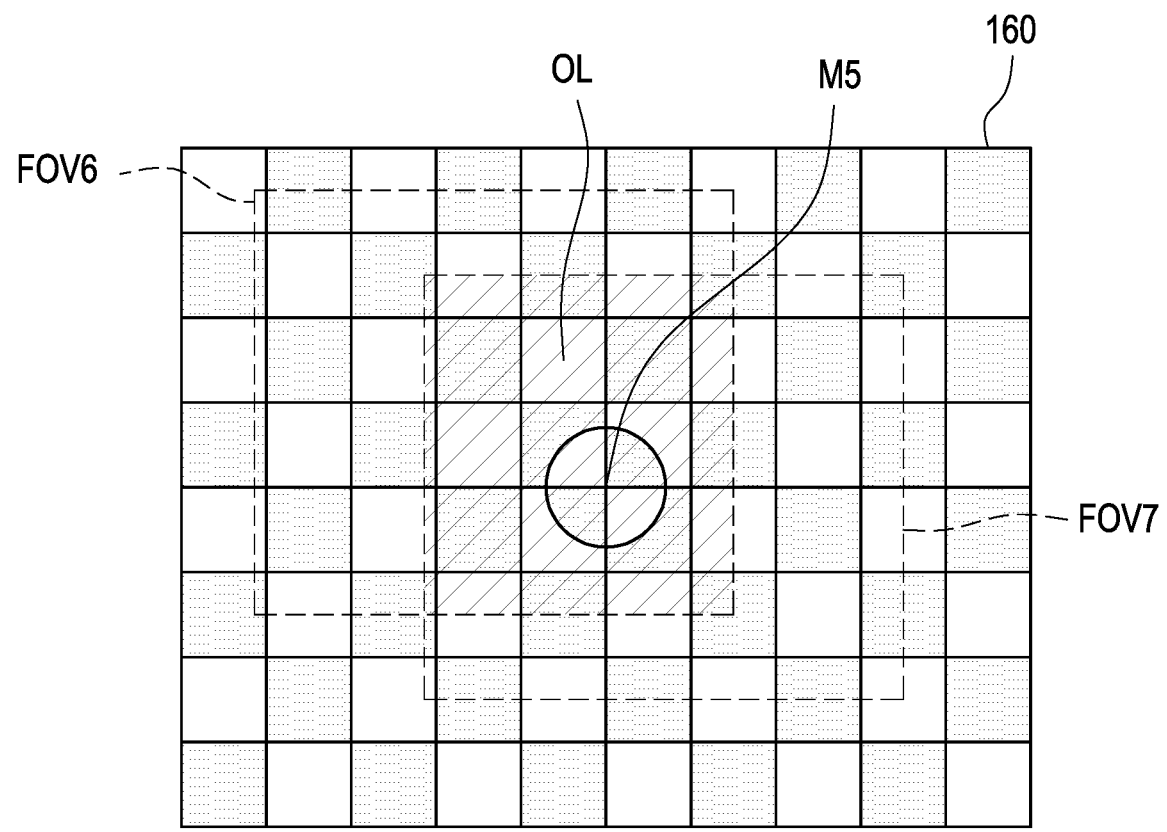
FIG. 16 is an example of using a calibration board to calibrate cameras according to another embodiment of the invention.

FIG. 16 is an example of using a calibration board to calibrate cameras according to another embodiment of the invention. Referring to FIG. 16, FOV6 and FOV7 respectively represent fields of view of two cameras of the multi-camera system when capturing the calibration images of the calibration board 160. Where, the fields of view FOV6 and FOV7 have an overlapping area OL, and the overlapping area OL includes a mark M5. Therefore, the calibration system may use the calibration images captured by the two cameras to calibrate the extrinsic parameters and intrinsic parameters of the cameras.

For the extrinsic parameters, the calibration system may use common features in the overlapping area OL to calibrate the extrinsic parameters of the two cameras; and for the intrinsic parameters, the calibration system may respectively use the features located in the fields of view FOV6 and FOV7 to calibrate the intrinsic parameters of the two camera. However, in an actual situation, the rectangular pattern of the calibration board in the calibration image captured by the camera is not necessarily a rectangle, but may be of any shape due to camera rotation and/or lens distortion.

Figure 17A:
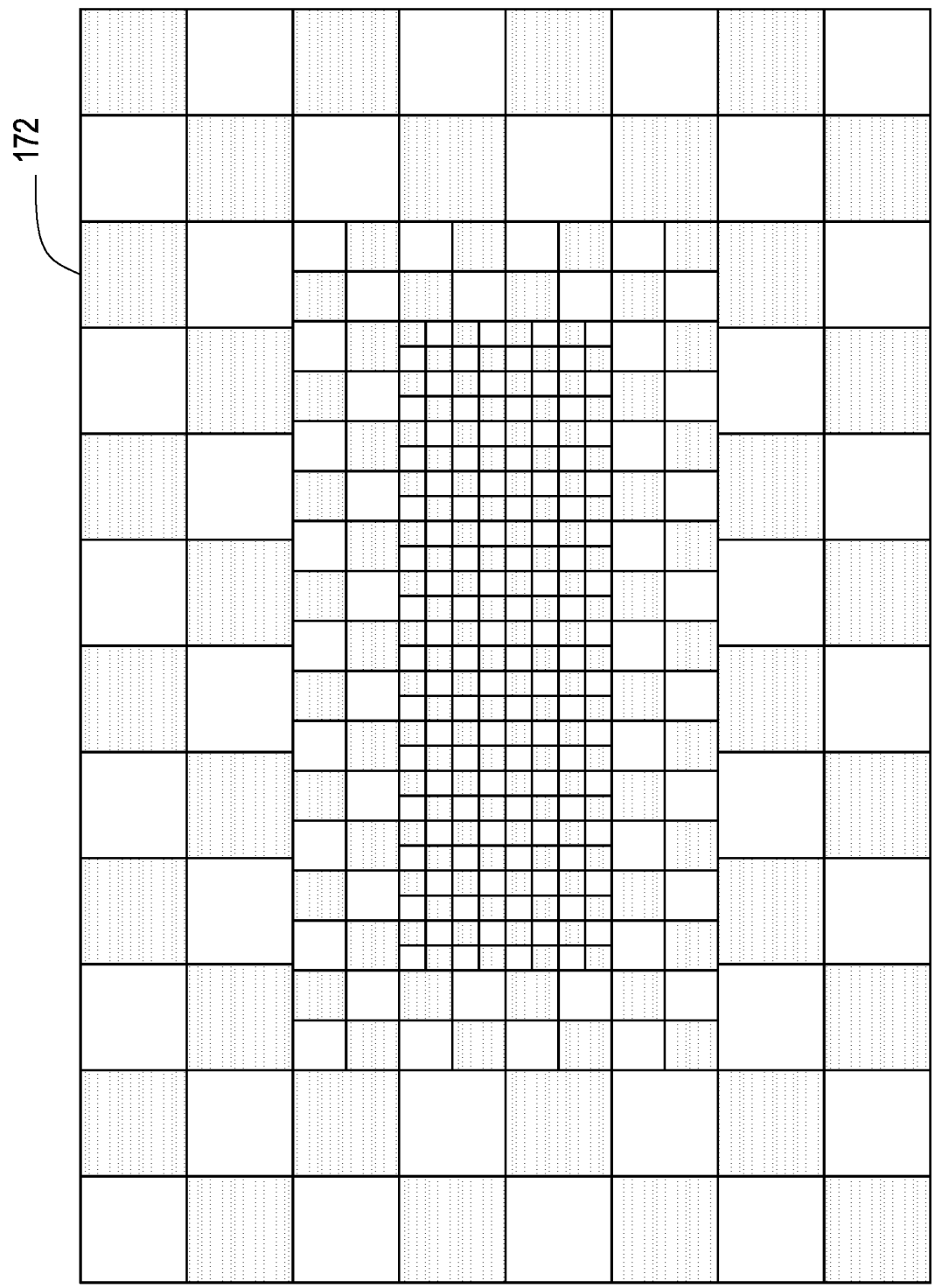
FIG. 17A and FIG. 17B are examples of patterns of a calibration board according to an embodiment of the invention.
Figure 17B:
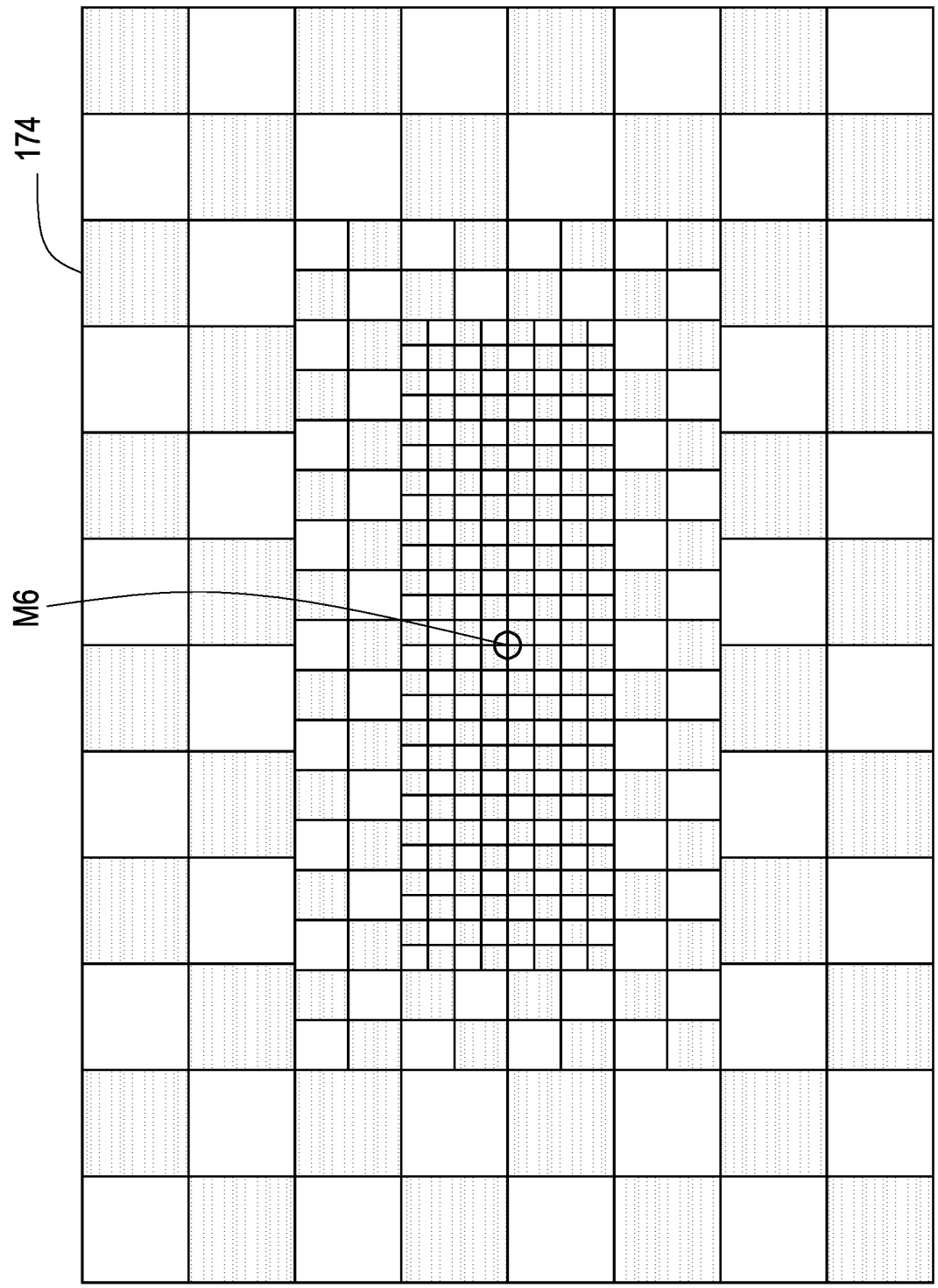

FIG. 17A and FIG. 17B are examples of patterns of a calibration board according to an embodiment of the invention. Lens distortion (for example, a fisheye lens) may probably cause image scaling (scaling down) near an edge of the image captured by the camera, at this time, by changing the pattern on the calibration board, a size of each feature in the pattern changes along with a distance from a center. Since there is the minimum pattern size for feature detection, the pattern on the edge of the fisheye may be probably distorted to a very small area, resulting in detection failure. Therefore, the embodiment resolves the problem by increasing the size of the pattern located in the border area.

In FIG. 17A, a pattern of a calibration board 172 adopts a three-stage pattern, i.e., the size of the pattern gradually decreases in three stages from the periphery to the center. Where, the density of the pattern may be used as the non-conventional feature of the calibration board 172. Since when a camera using a fisheye lens is used to capture an image, the pattern size will be reduced on image border, the use of a pattern with a higher density may reduce the difference in size between center and border area of pattern in the image captured by the fisheye camera. In another embodiment, the density is changed according to the distance from a center point of the pattern instead of changing in a rectangular range as shown in FIG. 17A. In fact, the variation of density may exist in any form.

In FIG. 17B, except that a pattern of a calibration board 174 also adopts a three-stage pattern (i.e., the size of the pattern gradually decreases in three stages from the periphery to the center), a non-conventional feature M6 is added to serve as a reference for calibrating the camera.

In summary, the calibration system of the multi-camera system of the invention captures the calibration image of the calibration board, analyzes the conventional features and the non-conventional feature from the calibration image, and uses the non-conventional feature as a reference feature to transform and matches the positions of the conventional features, thereby increasing a success rate of calibration, and the size of the calibration board may be increased to support feature matching of multiple cameras.

What is claimed is:

1. A calibration system for a multi-camera system, comprising:
    a connection device coupled to a plurality of cameras;
    a storage device; and
    a processor coupled to the connection device and the storage device, and is configured to:
    control each of the cameras to capture a calibration image of a calibration board, wherein the calibration board has a pattern comprising a plurality of conventional features and at least one non-conventional feature, and a field of view (FOV) of the calibration image of at least one of the cameras does not contain at least one of the conventional features of the pattern;
    detect the conventional features and the non-conventional feature in the calibration image and record positions of the conventional features and the non-conventional feature in the storage device;
    use the position of the non-conventional feature as reference coordinates to transform the position of each of the conventional features into absolute coordinates relative to the reference coordinates; and
    match the conventional features in the calibration images captured by the cameras according to the absolute coordinates of the transformed conventional features, so as to calibrate the cameras.

2. The calibration system for the multi-camera system according to claim 1, wherein the pattern is a checkerboard formed by a plurality of blocks of different colors arranged in interleaving, and the conventional features are intersections of the blocks.

3. The calibration system for the multi-camera system according to claim 2, wherein the processor is configured to detect a form of each of the blocks in the checkerboard to identify at least one of the blocks with the form changed as the non-conventional feature, and the form comprises at least one of color, brightness, shape, texture, presence/absence, and density.

4. The calibration system for the multi-camera system according to claim 2, wherein the processor is configured to detect a form of each of the blocks in the checkerboard to identify the conventional feature added or deleted due to a change of the form of at least one of the blocks as the non-conventional feature, and the form comprises at least one of shape, texture, presence/absence, and density.

5. The calibration system for the multi-camera system according to claim 2, wherein the processor is configured to identify a geometric figure configured at the position of at least one of the conventional features as the non-conventional feature.

6. The calibration system for the multi-camera system according to claim 1, wherein the pattern comprises a plurality of geometric figures arranged according to a predetermined rule, and the conventional features are the geometric figures.

7. The calibration system for the multi-camera system according to claim 6, wherein the processor is configured to detect a form of each of the geometric figures in the pattern to identify at least one of the geometric figures with the form changed as the non-conventional feature, and the form comprises at least one of color, shape, texture, presence/absence, and density.

8. The calibration system for the multi-camera system according to claim 6, wherein the processor is configured to detect a form of each of the geometric figures in the pattern to identify the conventional feature added or deleted due to a change of the form of at least one of the geometric figures as the non-conventional feature.

9. The calibration system for the multi-camera system according to claim 6, wherein the processor is configured to detect a form of a background around at least one of the geometric figures in the pattern to identify the background with the form changed as the non-conventional feature, and the form comprises at least one of color, shape, size, and texture.

10. The calibration system for the multi-camera system according to claim 6, wherein the processor is configured to identify a checkerboard formed by a plurality of blocks of different colors arranged in interleaving at the position of the at least one of the conventional features as the non-conventional feature.

11. The calibration system for the multi-camera system according to claim 1, wherein the processor is configured to predict a position of a next conventional feature based on the positions of the sequentially arranged conventional features.

12. The calibration system for the multi-camera system according to claim 1, wherein the calibration board is a three-dimensional object, and at least one surface of the three-dimensional object comprises the pattern.

13. The calibration system for the multi-camera system according to claim 1, wherein the position of the non-conventional feature comprises a position of a center point or an endpoint of the non-conventional feature.

14. The calibration system for the multi-camera system according to claim 1, wherein the processor is configured to use the conventional features matched with each other in the calibration images captured by the cameras to calculate extrinsic parameters or intrinsic parameters of the cameras.

15. The calibration system for the multi-camera system according to claim 1, wherein a density of the geometric figures in the pattern is determined by a lens characteristic of each of the cameras.

16. A calibration method for a multi-camera system, comprising:
    controlling each of a plurality of cameras to capture a calibration image of a calibration board, wherein the calibration board has a pattern comprising a plurality of conventional features and at least one non-conventional feature, and a field of view (FOV) of the calibration image of at least one of the cameras does not contain at least one of the conventional features of the pattern;
    detecting the conventional features and the non-conventional feature in the calibration image and recording positions of the conventional features and the non-conventional feature in a storage device;

using the position of the non-conventional feature as reference coordinates to transform the position of each of the conventional features into absolute coordinates relative to the reference coordinates; and matching the conventional features in the calibration images captured by the cameras according to the absolute coordinates of the transformed conventional features, so as to calibrate the cameras.

17. The calibration method for the multi-camera system according to claim 16, wherein the pattern is a checkerboard formed by a plurality of blocks of different colors arranged in interleaving, and the conventional features are intersections of the blocks.

18. The calibration method for the multi-camera system according to claim 16, wherein the pattern comprises a plurality of geometric figures arranged according to a predetermined rule, and the conventional features are the geometric figures.

19. The calibration method for the multi-camera system according to claim 16, further comprising predicting a position of a next conventional feature based on the positions of the sequentially arranged conventional features.

20. The calibration method for the multi-camera system according to claim 16, wherein a density of the geometric figures in the pattern is determined by a lens characteristic of each of the cameras.

* * * * *